United States Patent
Hardin et al.

(10) Patent No.: US 10,448,195 B2
(45) Date of Patent: Oct. 15, 2019

(54) TRANSPORTATION ANALYTICS EMPLOYING TIMED FINGERPRINT LOCATION INFORMATION

(71) Applicant: AT&T Mobility II LLC, Atlanta, GA (US)

(72) Inventors: Stephen Thomas Hardin, Suwanee, GA (US); Thomas Rodger Becker, Atlanta, GA (US); Charles A. Carey, Kirkland, WA (US); Zachary Orlynn Morsbach, Cedar Park, TX (US); Johnathan Bradley Webb, Katy, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 220 days.

(21) Appl. No.: 14/881,335

(22) Filed: Oct. 13, 2015

(65) Prior Publication Data

US 2016/0033285 A1   Feb. 4, 2016

Related U.S. Application Data

(63) Continuation of application No. 13/277,595, filed on Oct. 20, 2011, now Pat. No. 9,196,157.

(51) Int. Cl.
*H04W 4/02* (2018.01)
*G08G 1/01* (2006.01)

(52) U.S. Cl.
CPC ............ *H04W 4/02* (2013.01); *G08G 1/0112* (2013.01)

(58) Field of Classification Search
CPC ................................ G08G 1/0112; H04W 4/02
See application file for complete search history.

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Notice of Allowance dated Aug. 21, 2014 for U.S. Appl. No. 13/447,069, 78 pages.

(Continued)

*Primary Examiner* — Charles J Han
(74) *Attorney, Agent, or Firm* — Amin, Turocy & Watson, LLP

(57) ABSTRACT

The disclosed subject matter provides for traffic analysis employing timed fingerprint location information. In an aspect, TFL information can be associated with location characteristics for a UE. These location characteristics can describe the motion of the UE. As such, with proper analysis, the motion of the UE can be correlated to traffic patterns. Transportation analytics can employ TFL information to provide real time or near real time traffic information, forecast traffic conditions, or automate response to traffic conditions based on TFL information. Whereas TFL can provide advantages over other types of location information systems, leveraging TFL information in traffic analysis can reflect these advantages. Further, whereas TFL information can be gathered from nearly all modern and many legacy mobile devices, large volumes of TFL information can be employed in related transportation analytics.

20 Claims, 12 Drawing Sheets

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A * | 8/2000 | Ito .................. G01S 5/0036 455/456.2 |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,437,790 B1 | 5/2013 | Hassan et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,768,348 B2 | 7/2014 | Stuempert et al. |
| 8,849,254 B2 | 9/2014 | Bolon et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,002,373 B2 | 4/2015 | Marti et al. |
| 9,008,684 B2 | 4/2015 | Tipton et al. |
| 9,008,698 B2 | 4/2015 | Meredith et al. |
| 9,053,513 B2 | 6/2015 | Meredith et al. |
| 9,066,227 B2 | 6/2015 | Spencer et al. |
| 9,100,891 B2 | 8/2015 | Zheng et al. |
| 9,137,772 B2 | 9/2015 | Hazzani et al. |
| 9,196,157 B2 | 11/2015 | Hardin et al. |
| 9,232,399 B2 | 1/2016 | Tipton et al. |
| 9,351,111 B1 | 5/2016 | Kaufman et al. |
| 9,473,904 B2 | 10/2016 | Bennett |
| 9,510,355 B2 | 11/2016 | Meredith et al. |
| 9,519,043 B2 | 12/2016 | Fix et al. |
| 9,537,950 B2 | 1/2017 | Ibasco et al. |
| 9,564,962 B2 | 2/2017 | Yarnold et al. |
| 9,596,671 B2 | 3/2017 | Fix et al. |
| 9,667,660 B2 | 5/2017 | Tipton et al. |
| 9,723,446 B2 | 8/2017 | Fix et al. |

(56) References Cited

U.S. PATENT DOCUMENTS

| | | |
|---|---|---|
| 9,769,615 B2 | 9/2017 | Fix et al. |
| 9,769,623 B2 | 9/2017 | Fix et al. |
| 9,807,250 B2 | 10/2017 | Austin et al. |
| 9,810,765 B2 | 11/2017 | Fix et al. |
| 9,813,900 B2 | 11/2017 | Meredith et al. |
| 9,858,575 B2 | 1/2018 | Meredith et al. |
| 10,084,824 B2 | 9/2018 | Tipton et al. |
| 10,206,056 B2 | 2/2019 | Kaufman et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0043037 A1 | 2/2005 | Ioppe et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0143292 A1 | 6/2006 | Taubenheim et al. |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0276168 A1 | 12/2006 | Fuller, Jr. et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1* | 3/2009 | Howarter ......... G08G 1/096783 701/117 |
| 2009/0079622 A1 | 3/2009 | Seshadri et al. |
| 2009/0104917 A1 | 4/2009 | Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0161599 A1* | 6/2009 | Haartsen ............... H04W 56/00 370/326 |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |

(56) References Cited

U.S. PATENT DOCUMENTS

| | | |
|---|---|---|
| 2011/0028129 A1 | 2/2011 | Hutchison et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0143758 A1 | 6/2012 | Anantha et al. |
| 2012/0144452 A1 | 6/2012 | Dyor et al. |
| 2012/0144457 A1 | 6/2012 | Counterman |
| 2012/0158289 A1 | 6/2012 | Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0192258 A1 | 7/2012 | Spencer et al. |
| 2012/0214509 A1 | 8/2012 | Levin et al. |
| 2012/0221232 A1 | 8/2012 | Shang et al. |
| 2012/0253656 A1* | 10/2012 | Brandt ............... G01C 21/3484 701/410 |
| 2012/0276900 A1 | 11/2012 | Stephens et al. |
| 2012/0282924 A1 | 11/2012 | Tagg et al. |
| 2012/0286997 A1 | 11/2012 | Lin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0078994 A1 | 3/2013 | Jouin |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0150053 A1 | 6/2013 | Hwang et al. |
| 2013/0226451 A1 | 8/2013 | O'Neill et al. |
| 2013/0267242 A1 | 10/2013 | Curticapean et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2014/0365488 A1 | 12/2014 | Arslan et al. |
| 2015/0011249 A1 | 1/2015 | Siliski et al. |
| 2015/0098712 A1 | 4/2015 | Li et al. |
| 2015/0147997 A1 | 5/2015 | Shaw et al. |
| 2015/0324718 A1 | 11/2015 | Lord et al. |
| 2016/0321642 A1 | 11/2016 | Kaufman et al. |
| 2017/0280317 A1 | 9/2017 | Tagg et al. |
| 2017/0318428 A1 | 11/2017 | Wang et al. |
| 2019/0166574 A1 | 5/2019 | Abou-Rizk et al. |

FOREIGN PATENT DOCUMENTS

| | | |
|---|---|---|
| EP | 2999241 | 3/2016 |
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

Office Action dated Aug. 11, 2014 for U.S. Appl. No. 14/279,176, 22 pages.

Office Action dated Nov. 14, 2014 for U.S. Appl. No. 13/277,595, 74 pages.

Notice of Allowance dated Nov. 20, 2014 for U.S. Appl. No. 13/866,909, 27 pages.

Notice of Allowance dated Dec. 9, 2014 for U.S. Appl. No. 12/958,146, 48 pages.

Office Action dated Dec. 11, 2014 for U.S. Appl. No. 13/447,072, 28 pages.

Office Action dated Dec. 1, 2014 for U.S. Appl. No. 13/495,756, 76 pages.

Office Action dated Jan. 7, 2015 for U.S. Appl. No. 13/557,425, 30 pages.

Notice of Allowance dated Jan. 21, 2015 for U.S. Appl. No. 13/495,391, 98 pages.

Notice of Allowance dated Feb. 6, 2015 for U.S. Appl. No. 13/204,535, 20 pages.

Office Action dated Feb. 13, 2015 for U.S. Appl. No. 14/516,286, 62 pages.

Girardin, et al., "Digital footprinting: Uncovering tourists with user generated content." Pervasive Computing, IEEE 7.4, Oct.-Nov. 2008. 8 pages.

Steinfield, "The development of location based services in mobile commerce." ELife after the Dot Com Bust. PhysicaVerlagHD, 2004. 15 pages.

Sevtsuk, et al., "Does urban mobility have a daily routine? Learning from the aggregate data of mobile networks." Journal of Urban Technology, vol. 17, No. 1, Apr. 2010: 20 pages.

(56) References Cited

OTHER PUBLICATIONS

Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Office Action dated Sep. 14, 2015 for U.S. Appl. No. 13/557,425, 32 pages.
Office Action dated Apr. 16, 2015 for U.S. Appl. No. 14/521,431, 82 Pages.
Notice of Allowance dated Mar. 13, 2015 for U.S. Appl. No. 13/494,959, 41 Pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al, "Location Privacy Enforcement in a Location-Based Services Platform," IEEE, 2009, 5 pages.
Phillips, Jr., et al., "Information Sharing and Security in Dynamic Coalitions," ACM, 2002, pp. 87-96, 10 pages.
Moniruzzaman, et al., "A Study of Privacy Policy Enforcement in Access Control Models", Proceedings of 13th International Conference on Computer and Information Technology IEEE, 2010, pp. 352-357, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 Pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Nov. 30, 2015 for U.S. Appl. No. 13/447,072, 45 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In the american heritage dictionary of the english language. Retrieved on May 9, 2014 from http://search.credoreference.com/content/entry/hmdictenglang/represent/0.
Office Action dated May 20, 2014 for U.S. Appl. No. 13/551,369, 29 pages.
Office Action dated May 30, 2014 for U.S. Appl. No. 13/277,595, 49 pages.
Office Action dated Jun. 3, 2014 for U.S. Appl. No. 13/523,770, 53 pages.
Office Action dated Jun. 6, 2014 for U.S. Appl. No. 13/447,072, 25 pages.
Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Notice of Allowance dated Aug. 12, 2013, for U.S. Appl. No. 13/174,541, 40 pages.
Office Action dated Aug. 2, 2013, for U.S. Appl. No. 13/188,295, 26 pages.
Office Action dated Aug. 2, 2013, for U.S. Appl. No. 13/188,300, 38 pages.
Office Action dated Jun. 20, 2013, for U.S. Appl. No. 13/219,911, 61 pages.
Office Action dated Jul. 17, 2013, for U.S. Appl. No. 13/188,345, 27 pages.
Office Action dated Jun. 20, 2013, for U.S. Appl. No. 13/291,917, 52 pages.
Office Action dated May 31, 2013, for U.S. Appl. No. 13/523,770, 40 pages.
Office Action dated Sep. 19, 2013, for U.S. Appl. No. 13/927,020, 30 pages.
Office Action dated Oct. 2, 2013 for U.S. Appl. No. 12/958,146, 31 pages.
Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).

(56) References Cited

OTHER PUBLICATIONS

Wayback machine archive from Jan. 21, 2009 of the mySociety Web page, "More travel-time maps and their uses", Downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Office Action dated Nov. 5, 2013 for U.S. Appl. No. 13/188,136, 47 pages.
Office Action dated Sep. 18, 2013, for U.S. Appl. No. 13/284,497, 30 pages.
Office Action dated Aug. 22, 2013, for U.S. Appl. No. 13/277,595, 36 pages.
Office Action dated Oct. 21, 2013, for U.S. Appl. No. 13/523,770, 24 pages.
Office Action dated Nov. 5, 2013 for U.S. Appl. No. 13/188,345, 30 pages.
Office Action dated Dec. 11, 2013, for U.S. Appl. No. 13/188,295, 52 pages.
Office Action dated Dec. 24, 2013, for U.S. Appl. No. 13/188,300, 44 pages.
Office Action dated Dec. 11, 2013, for U.S. Appl. No. 13/291,917, 34 pages.
Office Action dated Jan. 15, 2014 for U.S. Appl. No. 13/219,911, 38 pages.
Office Action dated Jan. 28, 2014, for U.S. Appl. No. 12/958,146, 24 pages.
Notice of Allowance dated Feb. 14, 2014 for U.S. Appl. No. 13/284,456, 30 pages.
Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN Iu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Jan. 11, 2016 for U.S. Appl. No. 13/175,199, 29 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Jun. 10, 2016 for U.S. Appl. No. 14/548,901, 33 pages.
Office Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

(56) References Cited

OTHER PUBLICATIONS

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-group a1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens, et al., "Least squares support vector machine classifiers", Neural Processing Letters, vol. 9, No. 3, Jun. 1999, pp. 293-300.
Ferris, et al. (2002). "Interior-point methods for massive support vector machines". SIAM Journal on Optimization 13: 783-804. doi:10.1137/S1052623400374379.
Meyer, et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rtz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.
Bitcarrier Technology. Published online at http://www.bitcarrier.com/technology, retreived on Aug. 15, 2011, 1 page.
Hao Peng, Ban Xuegang(Jeff). Estimating Vehicle Position in a Queue at Signalized Intersections Using Simple Travel Times from Mobile Sensors, retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Office Action dated Jan. 25, 2013, for U.S. Appl. No. 13/554,285, 20 pgs.
Office Action dated Mar. 19, 2013, for U.S. Appl. No. 13/174,541, 46 pgs.
Office Action dated Feb. 13, 2013, for U.S. Appl. No. 13/220,083, 48 pgs.
Office Action dated Feb. 22, 2013, for U.S. Appl. No. 13/188,345, 45 pgs.
Office Action dated Mar. 15, 2013, for U.S. Appl. No. 13/204,535, 18 pgs.
Office Action dated Mar. 19, 2013, for U.S. Appl. No. 13/284,497, 46 pgs.
Office Action dated Apr. 19, 2013, for U.S. Appl. No. 13/277,595, 58 pages.
Office Action dated Jan. 13, 2017 for U.S. Appl. No. 14/601,800, 95 pages.
Office Action dated Jan. 26, 2017 for U.S. Appl. No. 14/877,915, 20 pages.
Office Action dated Feb. 14, 2017 for U.S. Appl. No. 14/641,242, 120 pages.
Office Action dated Feb. 15, 2017 for U.S. Appl. No. 15/191,877, 104 pages.
Office Action dated Feb. 27, 2017 for U.S. Appl. No. 15/132,220, 91 pages.
Notice of Allowance dated Apr. 10, 2017 for U.S. Appl. No. 14/676,066, 33 pages.
Office Action dated Jun. 12, 2017 for U.S. Appl. No. 15/132,220, 25 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Office Action dated Jun. 19, 2017 for U.S. Appl. No. 13/447,072, 47 pages.
Office Action dated Jul. 5, 2017 for U.S. Appl. No. 15/191,877, 32 pages.
Office Action dated Jul. 25, 2017 for U.S. Appl. No. 15/422,147, 86 pages.
Office Action dated Sep. 30, 2016 for U.S. Appl. No. 14/957,525, 72 pages.
Notice of Allowance dated Oct. 7, 2016 for U.S. Appl. No. 14/548,901, 45 pages.
Office Action dated Oct. 12, 2016 for U.S. Appl. No. 14/877,915, 34 pages.

(56) References Cited

OTHER PUBLICATIONS

Notice of Allowance dated Nov. 16, 2016 for U.S. Appl. No. 15/186,410, 80 pages.
Office Action dated Dec. 28, 2016 for U.S. Appl. No. 13/447,072, 34 pages.
Notice of Allowance dated Aug. 16, 2017 for U.S. Appl. No. 14/877,915, 63 pages.
Office Action dated Oct. 4, 2017 for U.S. Appl. No. 15/235,502, 80 pages.
Office Action dated Sep. 28, 2017 for U.S. Appl. No. 15/344,468, 107 pages.
Office Action dated Sep. 28, 2017 for U.S. Appl. No. 15/132,220, 29 pages.
Office Action dated Oct. 18, 2017 for U.S. Appl. No. 15/629,366, 131 pages.
Office Action dated Oct. 16, 2017 for U.S. Appl. No. 15/131,793, 84 pages.
Office Action dated Nov. 15, 2017 for U.S. Appl. No. 15/191,877, 30 pages.
Office Action dated Jan. 8, 2018 for U.S. Appl. No. 15/132,220, 30 pages.
Office Action dated Jan. 24, 2018 for U.S. Appl. No. 15/603,416, 99 pages.
Office Action dated Mar. 30, 2018 for U.S. Appl. No. 15/235,502, 14 pages.
Office Action dated Mar. 27, 2018 for U.S. Appl. No. 15/629,366, 23 pages.
Office Action dated May 2, 2018 for U.S. Appl. No. 14/704,949, 95 pages.
Office Action dated May 11, 2018 for U.S. Appl. No. 15/132,220, 29 pages.
Office Action dated May 30, 2018 for U.S. Appl. No. 15/629,366, 30 pages.
Office Action dated May 31, 2018 for U.S. Appl. No. 15/603,421, 91 pages.
Office Action dated Jun. 13, 2018 for U.S. Appl. No. 15/191,877, 33 pages.
Notice of Allowance dated May 21, 2018 for U.S. Appl. No. 15/344,468, 45 pages.
Office Action dated Nov. 27, 2018 for U.S. Appl. No. 15/629,366, 35 pages.
Office Action dated Jan. 31, 2019 for U.S. Appl. No. 16/006,942, 112 pages.
Office Action dated Sep. 24, 2018 for U.S. Appl. No. 15/996,203, 21 pages.
Non-Final Office Action dated Aug. 27, 2018 for U.S. Appl. No. 16/006,942, 24 pages.
Ouyang, Y. & Fallah, M. H., "The Impact of Cell Site Re-homing on the Performance of UMTS Core Networks", International Journal of Next Generation Network (IJ NGN), vol. 2, No. 1, Mar. 2010.
Office Action dated Nov. 19, 2018 for U.S. Appl. No. 16/108,060, 27 pages.
Notice of Allowance dated Oct. 19, 2018 for U.S. Appl. No. 14/704,949, 24 pages.
Office Action dated Mar. 6, 2019 for U.S. Appl. No. 15/996,203, 117 pages.
Office Action dated Mar. 20, 2019 for U.S. Appl. No. 15/629,366, 26 pages.
Non-Final Office Action received for U.S. Appl. No. 16/434,164 dated Jul. 22, 2019, 24 pages.
Notice of Allowance received for U.S. Appl. No. 15/996,203 dated Aug. 19, 2019, 18 pages.

\* cited by examiner

TRANSPORTATION ANALYTICS EMPLOYING TIMED FINGERPRINT LOCATION INFORMATION

CROSS-REFERENCE TO RELATED APPLICATIONS

This application is a continuation of, and claims priority to, U.S. patent application Ser. No. 13/277,595, filed 20 Oct. 2011, entitled TRANSPORTATION ANALYTICS EMPLOYING TIMED FINGERPRINT LOCATION INFORMATION, which is hereby incorporated by reference in its entirety.

TECHNICAL FIELD

The disclosed subject matter relates to transportation analytics and, more particularly, to employing mobile devices as data sources for transportation analytics.

BACKGROUND

Transportation analytics is the application of computer technology, operational research, and statistics to solve transportation problems. Transportation analytics can include traffic flow analysis, which itself can include signalized intersection analysis. Generally, modern transportation analytics is carried out within a computerized information system and typically will involve extracting properties from large transportation related databases. Mathematics and statistics underpins the algorithms used in transportation analytics and comprises a large ongoing effort at many public and private institutions worldwide. Transportation analytics bridges the disciplines of computer science, statistics, and mathematics; however, data must still be acquired to feed the study and analysis of modern transportation systems. Effective transportation analytics can lead to improved road design, reduced traffic, greater fuel efficiency, and many other benefits.

DETAILED DESCRIPTION

Figure 1:
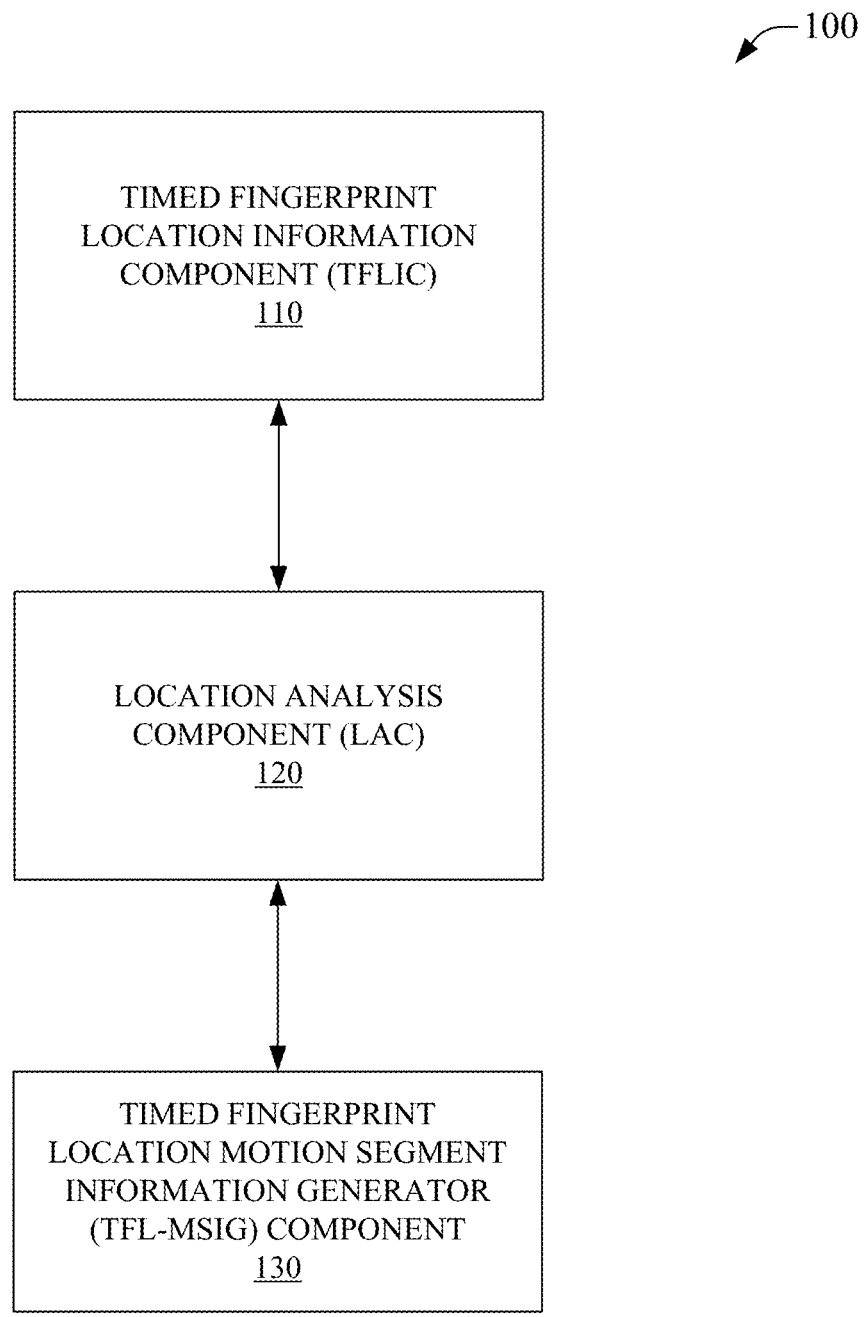
FIG. 1 is an illustration of a system that facilitates traffic analysis based on TFL information in accordance with aspects of the subject disclosure.

Transportation analytics can include the process of obtaining an optimal or realistic decision based on existing transportation data, including traffic data. There have been many efforts to gather practical data for transportation analytics. Conventionally, transportation analytics relied on static sensors such as loop detectors cut into a road surface to detect vehicular traffic. However, more modern conventional sensors now include the use of information gathered from mobile sensors. These mobile sensors can be dedicated devices such as transponders affixed to vehicles to relate traffic information. Further, these mobile sensors can include sensors on non-dedicated devices such as relaying information from a global position satellite (GPS) mapping device that a person may have in their vehicle or bicycle. As electronics allow mobile devices to do more and become ever more portable, transportation analytics scientist can expect to gain access to a rapidly increasing volume of traffic data from mobile devices.

In an aspect, the proliferation of a huge numbers of modern mobile phones and similar devices is viewed as a prime opportunity to gather data for transportation analytics. Conventional sources of transportation data from mobile devices are based on a wide variety of location determination technologies, such as GPS, triangulation, multilateration, near-field communications, etc., that provide location data for a mobile device over time. These sources of data have provided the opportunity to study transportation phenomenon in real time or near real time, which can allow for the generation of traffic related data for numerous other systems, such as, traffic visualizations, accident reporting/response, road design, roadway signal control, routing systems, estimated travel time analysis, etc. It is easily foreseeable that as computers begin to operate vehicles on our roadways, the need for transportation analytics will be able to provide for optimizing travel parameters for fuel efficiency (such as minimizing braking between traffic signals or for heavy traffic), temporal efficiency (such as by avoiding traffic or poorly timed signals), etc.

Whereas conventional systems rely on technologies such as GPS, triangulation, multilateration, near-field communications, etc., the use of timed fingerprint location (TFL) technology can provide advantages over the conventional technologies. For example, GPS is well known to be energy intensive and to suffer from signal confusion in areas with interference between the satellite constellation and the GPS enabled device. Further, GPS is simply not available on many mobile devices, especially where the devices are cost sensitive. Near-field communications technologies suffer from similar challenges as faced by GPS technologies and additionally require the use of additional hardware, such as beacons or receiver/transponders that must be located near enough to the near-filed sensor to operate. Multilateration and triangulation technologies are computationally intensive, which can result in processing time issues and a corresponding level of energy consumption.

The above-described deficiencies of conventional mobile device location data sources for transportation analytics is merely intended to provide an overview of some of problems of current technology, and are not intended to be exhaustive. Other problems with the state of the art, and corresponding benefits of some of the various non-limiting embodiments described herein, may become further apparent upon review of the following detailed description.

Various embodiments of the present disclosure relate to transportation analytics employing TFL information. In one example embodiment, a system comprises a location component that receives timed fingerprint location information associated with a UE. The exemplary system further comprises an analysis component that determines a value based on satisfaction of a predetermined condition relating the TFL information. This value can be a location characteristic. In some embodiments, location characteristics can be included in TFL motion segments as disclosed hereinbelow. The TFL motion segment information can be employed in transportation analytics.

In another example embodiment, a method comprises receiving TFL information for a UE. The example method further comprises analyzing the TFL information to determine a location characteristic. Motion segment information can be generated based on a set of location characteristics. The motion segment information can be employed in transportation analytics. In some embodiments, motion segment information can be aggregated with non-TFL based information to form a mixed data set. The mixed data set can also be employed in transportation analytics.

In another example embodiment, a computing device comprises a processor that can receive TFL information associated with a user equipment. The processor can further determine a location characteristic value based on the TFL information. A set of location characteristic values can be associated with the user equipment and used to determine traffic information. In an embodiment, the processor can forecast traffic patterns based on the set of location characteristics and a historic TFL information data set.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings.

In contrast to conventional transportation analytics techniques or systems employing conventional data sources, the presently disclosed subject matter illustrates employing timed fingerprint location (TFL) location information as a data source for transportation analytics. Transportation analytics can include traffic analysis and the terms are used interchangeably herein. TFL information can include location information or timing information as disclosed in more detail in U.S. Ser. No. 12/712,424 filed Feb. 25, 2010, which application is hereby incorporated by reference in its entirety. Further, such information can be accessed from active state or idle state user equipment as disclosed in more detail in U.S. Ser. No. 12/836,471, filed Jul. 14, 2010, which application is also hereby incorporated by reference in its entirety. As such, TFL information component can facilitate access to location information or timing information for a mobile device or user equipment (UE) in an active or idle state. TFL information can be information from systems in a timed fingerprint location wireless environment, such as a TFL component of a wireless telecommunications carrier. As a non-limiting example, UEs, including mobile devices not equipped with a GPS-type system, can be associated with TFL information, which can facilitate determining a location for a UE based on the timing information associated with the UE.

In an aspect, TFL information can include information to determine a differential value for a NodeB site pair and a bin grid frame, as disclosed in more detail in incorporated U.S. Ser. No. 12/712,424. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

In an aspect, TFL information can be employed to facilitate transportation analytics. Whereas TFL information can be associated with a UE location, the location of the UE can be tracked over time to determine UE movement and movement characteristics. This TFL based movement characteristic information can be analyzed to provide valuable transportation analytics information, for example, location, direction, speed, velocity, elevation, etc.

Moreover, whereas TFL is operable in a wide array of current and legacy devices without any substantial dependence on GPS technologies, a greater number of mobile devices can act as data sources for transportation analytics that would be expected for GPS-enabled devices at the current time. A greater number of data sources is generally considered desirable in transportation analytics. Further, where TFL information can be employed in a lookup of location data sets, TFL can be much less computationally intense than triangulation or multilateration technologies. Reduced computational load is generally desirable in UE devices. Further, TFL does not require a proliferation of secondary devices as would be typically needed for a near-field technology location identification system. TFL typically piggybacks on timing signals employed in wireless telecommunications, which systems are already deployed. A reduced need to rollout of additional hardware is generally considered desirable. Additionally, by piggybacking on existing timing signals and by reducing the computational load, TFL can be associated with minimal additional energy expenditure in sharp contrast to GPS or triangulation/multilateration technologies. Reduced energy expenditure is generally related to reduced battery drain in mobile devices and is typically a highly desirable trait.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates traffic analysis based on TFL information in accordance with aspects of the subject disclosure. System 100 can include timed fingerprint location information component (TFLIC) 110. TFLIC 110 can facilitate access to TFL information. TFL information can be location information derived from TFL timing information or TFL timing information that can facilitate determining a location. TFL timing information can be for one or more NBSPs. TFL information can be derived from timing associated with one or more NBSPs.

TFLIC 110 can be communicatively coupled to location analysis component (LAC) 120. LAC 120 can determine location characteristics from an analysis of TFL information. Location characteristics can be nearly any characteristic related to the location determined by analysis of the TFL information. Location characteristics can include a position, elevation, direction, speed, velocity, rate of speed change, rater of direction change, momentum, elapsed time as a function of location, etc. A location characteristic can describe an aspect of the UE location and a set of location characteristics can therefore describe some or all aspects of the UE location. As an example, a location characteristic can describe that a UE is stationary. As a second example, a set of location characteristics can describe that a UE is stationary at the corner of $5^{th}$ Ave. and Main St. As a further example, a set of location characteristics can describe that a UE has been stationary at the intersection of $5^{th}$ Ave. and Main St. for 13 seconds after decelerating from 25 miles per hour (MPH) to 0 MPH in 4 seconds while traveling along $5^{th}$ Ave. in a Westerly direction.

LAC 120 can be communicatively coupled to TFL motion segment information generator (TFL-MSIG) component 130, hereinafter MSIG component 130. MSIG component 130 can generate information relating to a motion segment for a UE based on location characteristics. A motion segment can be a set of location characteristics. A motion segment, the set of location characteristics, in one embodiment, can be as a function of time, e.g., the set of location characteristics describing the location of a UE over time. In other embodiments, the motion segment can be a function of other metrics, such as, location characteristics as a function of position, as a function of virtual trigger points crossed, etc. It is to be noted that the motion segment can include location characteristics as a function of nearly any metric without departing from the scope of the present disclosure. Further, the motion segment can contain location characteristics that are not functions of any value, for example, a motion segment comprising a distance value between two fixed points such as the NodeBs comprising a NBSP employed in a TFL measurement for a UE.

The motion segment as a function of time can describe a set of location characteristics over linear or non-linear time. For example, the motion segment can include a position characteristic every 5 seconds. As a second example, the motion segment can include a position characteristic every 5 seconds above 10 mph and every one second under 10 mph. The motion segment as a function of time can capture aspects of the position of a UE that can be employed in motion analysis to trace the path of a UE in space as a function of time. The particular format of the location characteristic data for the motion segment as a function of time can be nearly any format that allows the movement of the UE to be tracked and preferably analyzed. As such, the motion segment as a function of time can be employed to analyze the movement of the UE, which is presumably in the possession of a user and can therefore be correlated with the motions of the user by whatever means of transportation the user is employing. Error correction algorithms can be applied to correct for the possibility that the UE is not in the possession of a user.

Tracking the user employing transportation by way of the UE can allow transportation analytics to draw conclusions as to transportation patterns. For example, if a motion segment for a first UE is traveling at 2 MPH along $5^{th}$ Ave. and motion segments for 20 other UEs are traveling at 25 MPH along the same portion of $5^{th}$ Ave., it can be presumed that the first UE is with a user that is walking along $5^{th}$ Ave while the other UEs are with users that are driving along $5^{th}$ Ave. The particular analytical tools applied to the motion segment is outside of the instant subject matter, however, nearly any transportation analytic tool can readily be applied to a location characteristic derived from TFL information and embodied in the motion segment, as disclosed herein.

In other embodiments, the motion segment can comprise location characteristics that describe conditions that can be significant to a traffic analysis. For example, bicycles often will not trigger sensors at signalized intersections. Therefore, where a UE is on a person riding a bicycle, a location characteristic can be correlated to 'bicycle behavior', e.g., by considering the speed and track of the UE over time. A further location characteristic of the motion segment can give the position of the UE at a signalized intersection and another location characteristic can describe that the UE is stationary. These location characteristics of the motion segment can be analyzed to determine that it is likely that a bicyclist is waiting at the intersection to cross. This information can be employed to cause the signal to change, in view of other traffic conditions at the intersection, to allow the cyclist to cross. This analysis can be done without installing additional sensors at the intersection as is conventionally done to detect cyclists.

In another embodiment, the motion segment can comprise location characteristics that can be employed for forecasting traffic by way of a predictive analysis. For example, where a sporting event is underway at a stadium, it can be anticipated that when the event lets out, traffic conditions are likely to change. By tracking UEs at the stadium, the location characteristics comprising motion segment can provide information, such as, UE density characteristics, or information that large numbers of UEs at a location correlated with the stadium are in motion towards the exits or streets outside the stadium, useful to forecasting a traffic event. This information can be analyzed and employed to trigger notifications to local traffic enforcement assets, changes the programmed timing of signalized intersections to better manage the vehicles leaving the area, changes in parking meter rates at automated meters, changes to tolls on roadways, notifications to other commuters that the sporting event is letting out and to expect increased traffic, etc.

Figure 2:
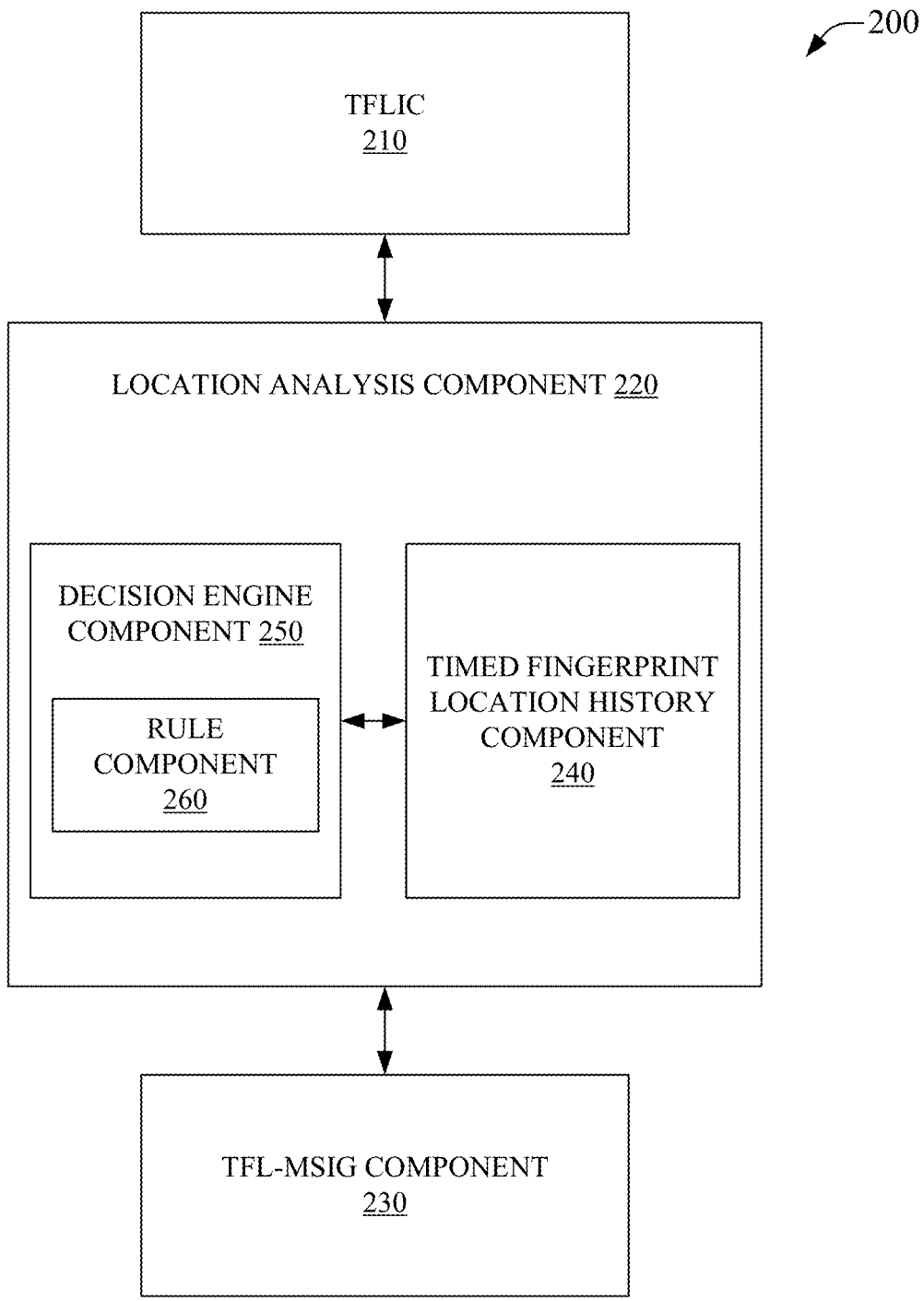
FIG. 2 is a depiction of a system that facilitates traffic analysis based on TFL information in accordance with aspects of the subject disclosure.

FIG. 2 is a depiction of a system 200, which can facilitate traffic analysis based on TFL information in accordance with aspects of the subject disclosure. System 200 can include TFLIC component 210. TFLIC 210 can facilitate access to TFL information. TFLIC 210 can be communicatively coupled to location analysis component 220. Location analysis component 220 can determine location characteristics from an analysis of TFL information. Location analysis component 220 can be communicatively coupled to TFL motion segment information generator (TFL-MSIG) component 230. TFL-MSIG component 230 can generate information relating to a motion segment for a UE based on location characteristics.

Location analysis component 220 can include TFL history component 240. TFL history component 240 can facilitate access to historic TFL information. In certain circumstances, access to historic TFL information can be valuable to transportation analytics. Historic TFL information, accessed by way of TFL history component 240, can include historic timing information, historic location information, a historic location characteristic, a historic motion segment, etc. Historic TFL information can be employed to generate historic location characteristics or motion segments. Historic motion segments can describe contiguous sets of location characteristics or can describe non-contiguous sets of location characteristics. For example, historic TFL information can be employed to determine location characteristics describing TFL information for a ten-minute period in ten contiguous one-minute historic motion segments. As a second example, the historic TFL information can be employed to determine historic location characteristics describing three non-contiguous historic motion segments, e.g., at one minute in the past, 18 minutes in the past, and 22 minutes in the past, etc.

Location analysis component 220 can further include Decision engine component 250 that can facilitate forming determinations relating to a traffic analysis rule. Determinations can include satisfying a traffic analysis rule, not satisfying a traffic analysis rule, satisfying part of a traffic analysis rule, applying a traffic analysis rule to a set of information, etc. A determination relating to a traffic analysis rule can be related to TFL information. For example, where a traffic analysis rule is satisfied when an instant UE location is the same as a historic TFL location, decision engine component 250 can determine that this rule is satisfied by comparing a TFL location with a set of historical TFL information. As a further example, decision engine component 250 can apply a weighting rule to TFL information and historical TFL information, such as where a rule indicates that a weighting factor of ½× is to be applied to historical TFL information over one hour old. Numerous other examples of specific rules are not explicitly recited for brevity but are to be considered within the scope of the present disclosure.

In an aspect, decision engine component 250 can include rule component 260 to facilitate forming determinations related to a traffic analysis rule. Rule component 260 can facilitate employing one or more traffic analysis rules. These rules can include rules for determining values pertinent to traffic analysis. For example, determining a value for traffic density, deceleration, acceleration, wait time at a location, change in type of transportation, type of transportation, direction, change in direction, velocity, location, etc. In an embodiment, rule component 260 can be a rule engine that allows the application of logical determinations to be embodied in one or more algorithms related to the analysis of a location characteristic. As a non-limiting example, rule component 260 can generate a rule that alters a weighting of a historical traffic activity based on the age of the historical traffic activity, e.g., where location characteristics describe flowing traffic 10 minutes in the past, this can be less significant than location characteristics describing slowing traffic five minutes in the past.

In other embodiments, rule component 260 can directly apply predetermined rules to traffic analysis. For example, rule component 260 can apply a weighting rule that amplifies traffic activities where the UE has recently employed search terms relating to traffic for an internet search. Further explicit examples are not provided for brevity but all such examples are to be considered within the scope of the present disclosure.

Figure 3:
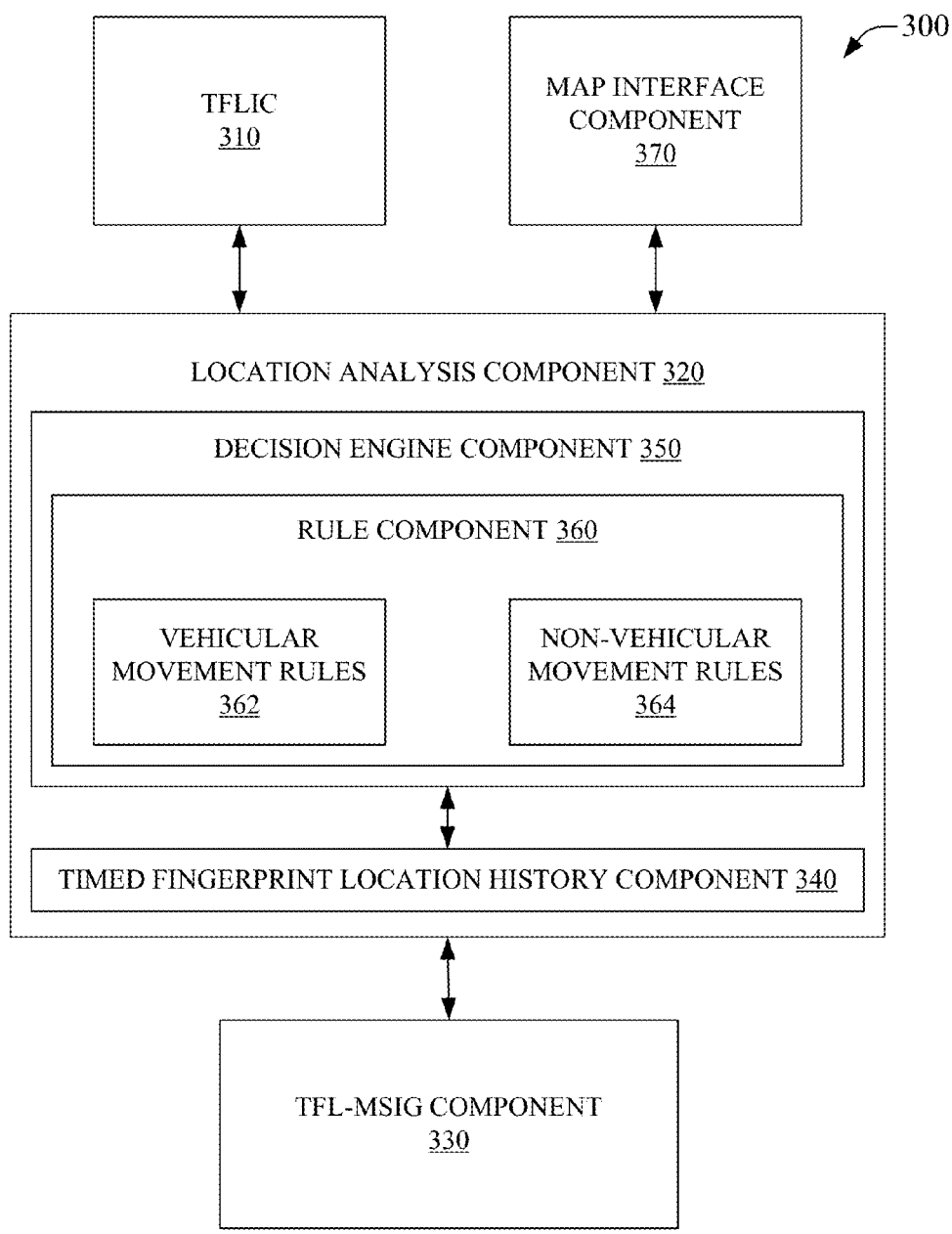
FIG. 3 illustrates a system that facilitates vehicular and non-vehicular traffic analysis based on TFL information in accordance with aspects of the subject disclosure.

FIG. 3 illustrates a system 300, which facilitates vehicular and non-vehicular traffic analysis based on TFL information in accordance with aspects of the subject disclosure. System 300 can include TFLIC component 310. TFLIC 310 can facilitate access to TFL information. TFLIC 310 can be communicatively coupled to location analysis component 320. Location analysis component 320 can determine location characteristics from an analysis of TFL information. Location analysis component 320 can be communicatively coupled to TFL motion segment information generator (TFL-MSIG) component 330. TFL-MSIG component 330 can generate information relating to a motion segment for a UE based on location characteristics. Location analysis component 320 can include TFL history component 340. TFL history component 340 can facilitate access to historic TFL information. Location analysis component 320 can further include decision engine component 350 that can facilitate forming determinations relating to a traffic analysis rule. Decision engine component 350 can include rule component 360 to facilitate forming determinations related to a traffic analysis rule.

Rule component 360 can include vehicular movement rules component 362 and non-vehicular rules component 364. Vehicular movement rules component 362 can facilitate access to rules relating to vehicular traffic analysis. In an aspect, vehicular movement rules component 362 can be a rule engine that generates a rule pertaining to vehicular movement analysis. Vehicular movement rules can be rules related to traffic analysis for one or more types of common conveyances typically associated with vehicular traffic. As an example, a vehicular rule can relate to analysis of tractor-trailer vehicle use of weigh stations, which can aid in scheduling staffing at weigh stations or in determining placement of weight-in-motion infrastructure. As another example, a vehicular rule can related to analysis of public transportation buses adherence to posted route schedules and estimated times of arrival (ETAs) at upcoming scheduled stops, which can aid in publishing ETAs to a website or texting interested patrons of public transit. As a further example, a vehicular rule can related to analysis of vehicles blocking intersections during scheduled signaling changes, which can facilitate the placement of red-light cameras or warning signs.

Similarly, rule component 360 can include non-vehicular rules component 364 that can facilitate access to rules relating to non-vehicular traffic analysis. Non-vehicular rules can be applied to analysis of non-vehicular location characteristics from TFL enabled UEs. In an aspect, non-vehicular rules can apply to non-vehicular forms of transportation, such as, pedestrian traffic, bicycle traffic, or even conveyances such as snowmobiles or horseback in appropriate circumstances. Non-vehicular rules can provide transportation analytics consideration of non-vehicular impacts of vehicular traffic and vehicular traffic impacts on non-vehicular traffic. For example, determining if an intersection should have pedestrian traffic in parallel with vehicular traffic or if there should be a pedestrian crossing cycle followed by a vehicle only cycle can be facilitated by an analysis of non-vehicular traffic, such as, where consistently high pedestrian volumes may favor certain design elements. Similarly, interactive control of signalized intersections by recognition of non-vehicular traffic without introducing substantial new infrastructure, e.g., changing a signal when detecting bicycles and pedestrians at crossings, can be highly beneficial to the safety of a transportation system.

System 300 can further include map interface component 370. Map interface component 370 can allow interactivity with map services. In an embodiment, map interface component 370 can receive map information and updates to map information. Map information can include features and locations depicted typically depicted on maps, such as, streets, structures, distances, directional information, routing information, etc. Map information can facilitate improved analysis of TFL information. For example, updated map information can indicate that a new bridge has been completed and this information can then be related to updates to rules applied by decision engine component 350 for the analysis of TFL motion segment information. In a further embodiment, map interface component 370 can source information to map services. For example, traffic density from the analysis of TFL motion segment information can be provided to a map service for them to provide traffic information to users of the map service. As another example, timing from signalized intersections can be determined from analysis of the stop and start location characteristics comprising motion segments associated with traffic at intersections. This signal timing can be provided to map services such that consumers of the map services, for example, can upload the information to their vehicles to allow the vehicles to tailor speed profiles between intersections to reduce the frequency with which the consumer arrives at a red-light, thus likely improving fuel economy and reducing driver frustration.

Figure 4:
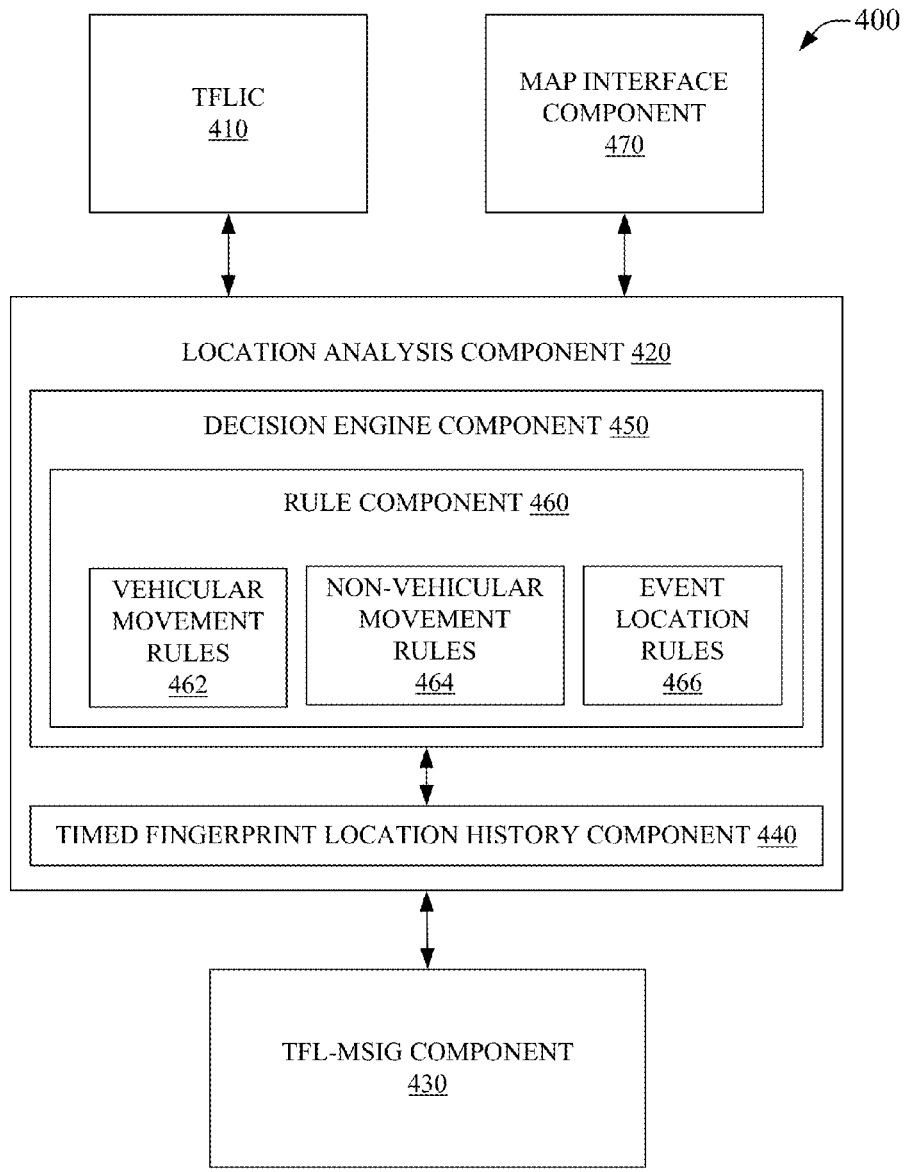
FIG. 4 is a depiction of a system that facilitates predictive traffic analysis based on TFL information in accordance with aspects of the subject disclosure.

FIG. 4 is a depiction of a system 400, which facilitates predictive traffic analysis based on TFL information in accordance with aspects of the subject disclosure. System 400 can include TFLIC component 410. TFLIC 410 can facilitate access to TFL information. TFLIC 410 can be communicatively coupled to location analysis component 420. Location analysis component 420 can determine location characteristics from an analysis of TFL information. Location analysis component 420 can be communicatively coupled to TFL-MSIG component 430. TFL-MSIG component 430 can generate information relating to a TFL motion segment for a UE based on location characteristics. Location analysis component 420 can include TFL history component 440. TFL history component 440 can facilitate access to historic TFL information. Location analysis component 420 can further include decision engine component 450 that can facilitate forming determinations relating to a traffic analysis rule. Decision engine component 450 can include rule component 460 to facilitate forming determinations related to a traffic analysis rule. System 400 can further include map interface component 470. Map interface component 470 can allow interactivity with map services.

Rule component 460 can include vehicular movement rules component 462 and non-vehicular rules component 464. Vehicular movement rules component 462 can facilitate access to rules relating to vehicular traffic analysis. Non-vehicular rules component 464 that can facilitate access to rules relating to non-vehicular traffic analysis.

Rule component 460 can further include event location rules component 466. Event location rules component 462 can facilitate employing one or more event location analysis rules. These rules can include rules for determining values pertinent to location characteristic analysis for events. Events can include almost any gathering of persons that can have an effect on transportation systems and therefor is desirable to include in transportation analytics. For example, determining that a sporting event is nearing a start time, or is nearly done, can allow for accommodation of related increases in traffic, both vehicular and non-vehicular, where the participation of event attendees can be tracked. For example, on a game night traffic can begin to increase before the game as people arrive to find typically limited parking. Where an increase in traffic density in an area around a stadium can be checked against scheduled events at the stadium, an analysis can indicate a likelihood of the traffic being related to an event at the stadium. Continuing the example, where an event is correlated with the increasing traffic, historical traffic patterns can be accessed to form a set of rules for managing a traffic increase forecast by application of a forecasting rule. Similarly, for example, UE density can be determined to be substantially thinning near a predicted end time for a sporting event, which can be correlated to a rapid increase in traffic as people leave the game and head home. As such, in this example, an event rule can be applied to adapt traffic and set notifications, etc., to better accommodate the forecast traffic increase as people leave.

Figure 5A:
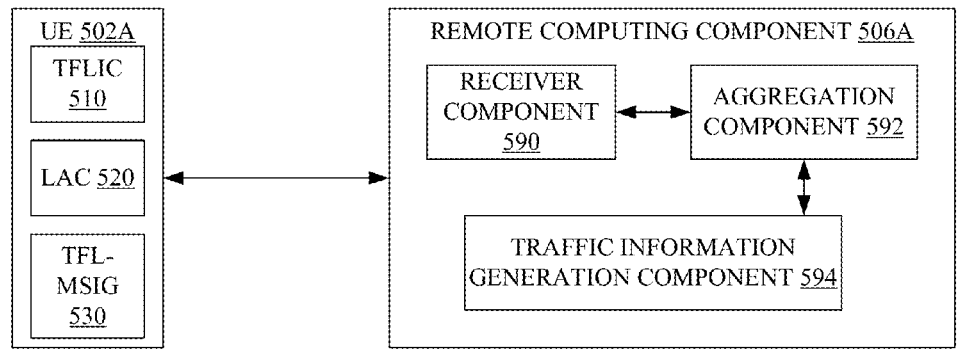
FIG. 5A-C are non-limiting depictions of exemplary systems that facilitate traffic analysis based on TFL information in accordance with aspects of the subject disclosure.
Figure 5B:
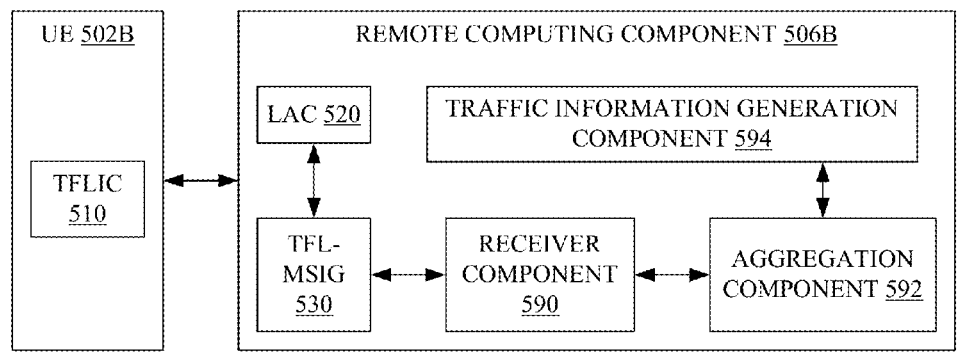
Figure 5C:
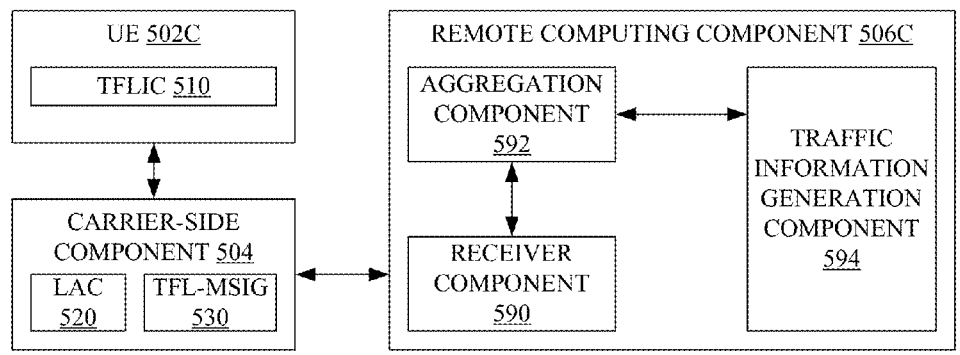

FIG. 5A-C are non-limiting depictions of exemplary systems 500A, 500B, and 500C, which facilitate traffic analysis based on TFL information in accordance with aspects of the subject disclosure. While three exemplary systems are illustrated, it is noted that numerous other examples of systems within the scope of the presently disclosed subject matter are not expressly illustrated for brevity.

System 500A illustrates a first non-limiting exemplary system configuration comprising UE 502A communicatively coupled to remote computing component 506A. UE 502A can include TFLIC component 510. TFLIC 510 can facilitate access to TFL information. TFLIC 510 can be communicatively coupled to location analysis component 520. Location analysis component 520 can determine location characteristics from an analysis of TFL information. Location analysis component 520 can be communicatively coupled to TFL-MSIG component 530. TFL-MSIG component 530 can generate information relating to a TFL motion segment for a UE based on location characteristics.

Remote computing component 506A can be any remote computing component configured to facilitate transportation analytics. In an embodiment, remote computing component 506A can be a carrier-side computing component, for example, a component located in a carrier radio access network (RAN), carrier core network (CN) system, or a carrier-side component separate from either the RAN or the CN system. In another embodiment, remote computing component 506A can be a third party computing component, such as, a government operated traffic analysis computer component, a map provider or map information service computer component, an information aggregator computer component, a search engine computer component, etc.

Numerous other examples of remote computing components are not expressly illustrated for brevity, but all are considered within the scope of the presently disclosed subject matter.

Remote computing component 506A can include receiver component 590 that can receive TFL motion segment information, such as that generated by TFL-MSIG 530. Receiver component 590 of remote computing component 506A can be communicatively coupled to aggregation component 592. Aggregation component 592 can aggregate traffic analysis information, including TFL motion segment information. Aggregation component 592, in an aspect, can provide insight into traffic patterns of large groups of UEs based on TFL motion segment information from many individual TFL enabled UEs by aggregating the individual TFL motion segment information to represent an overall traffic pattern. In an embodiment, aggregation can include data analysis and manipulation techniques, such as, data smoothing, outlier removal, weighting, etc. Aggregation component 592 can be communicatively coupled to traffic information generation component 594. Traffic information generation component 594 can receive aggregated traffic information and can generate user consumable traffic information. For example, traffic information generation component 594 can access an aggregated TFL motion segment information data store and can retrieve traffic data for a particular region in request to a user query. Further, traffic information generation component 594 can manipulate the retrieved data into a traffic density and can then display the traffic density in an overlay layer on a map corresponding to the particular region of the query. Numerous other examples of user consumable traffic information will be readily appreciated and should be considered within the scope of the present disclosure despite not being expressly recited for the sake of brevity and clarity.

Similar to system 500A, system 500B can include UE 502B and remote computing component 506B. UE 502B can include TFLIC component 510. TFLIC 510 can facilitate access to TFL information. UE 502B can be communicatively coupled to remote computing component 506B.

Remote computing component 506B can be any remote computing component configured to facilitate transportation analytics. Remote computing component 506B can include location analysis component 520. Location analysis component 520 can determine location characteristics from an analysis of TFL information. Location analysis component 520 can be communicatively coupled to TFL-MSIG component 530. TFL-MSIG component 530 can generate information relating to a TFL motion segment for a UE based on location characteristics. Remote computing component 506B can further include receiver component 590 that can receive TFL motion segment information, such as that generated by TFL-MSIG 530. Receiver component 590 of remote computing component 506B can be communicatively coupled to aggregation component 592. Aggregation component 592 can aggregate traffic analysis information, including TFL motion segment information. Aggregation component 592 can be communicatively coupled to traffic information generation component 594. Traffic information generation component 594 can receive aggregated traffic information and can generate user consumable traffic information.

System 500C can include UE 502C communicatively coupled to carrier-side component 504. UE 502C can include TFLIC component 510. TFLIC 510 can facilitate access to TFL information. Carrier-side component 504 can be any carrier-side computing component, for example, a component located in a carrier RAN, carrier CN system, or a carrier-side component separate from either the RAN or the CN system. In a non-limiting exemplary embodiment, carrier-side component 504 can be located in a carrier RAN to provide for rapid analysis of any large volumes of TFL motion segment information before allowing access to the information by remote computing component 506C. In an aspect, carrier-side component 504 can facilitate privacy practices by allowing a carrier to strip some or all identifying information from TFL motion segment information prior to sharing the information. Carrier-side component 504 can include location analysis component 520. Location analysis component 520 can determine location characteristics from an analysis of TFL information. Location analysis component 520 can be communicatively coupled to TFL-MSIG component 530. TFL-MSIG component 530 can generate information relating to a TFL motion segment for a UE based on location characteristics.

Carrier-side component 504 can be communicatively coupled to remote computing component 506C. Remote computing component 506C can be any remote computing component configured to facilitate transportation analytics. In one embodiment, remote computing component 506C can be a carrier-side computing component. In an aspect, carrier-side component 504 and remote computing component 506C can be the same component although this would result in a system very similar to system 500B. Remote computing component 506C can include receiver component 590 that can receive TFL motion segment information, such as that generated by TFL-MSIG 530. Receiver component 590 of remote computing component 506C can be communicatively coupled to aggregation component 592. Aggregation component 592 can aggregate traffic analysis information, including TFL motion segment information. Aggregation component 592 can be communicatively coupled to traffic information generation component 594. Traffic information generation component 594 can receive aggregated traffic information and can generate user consumable traffic information.

Figure 6:
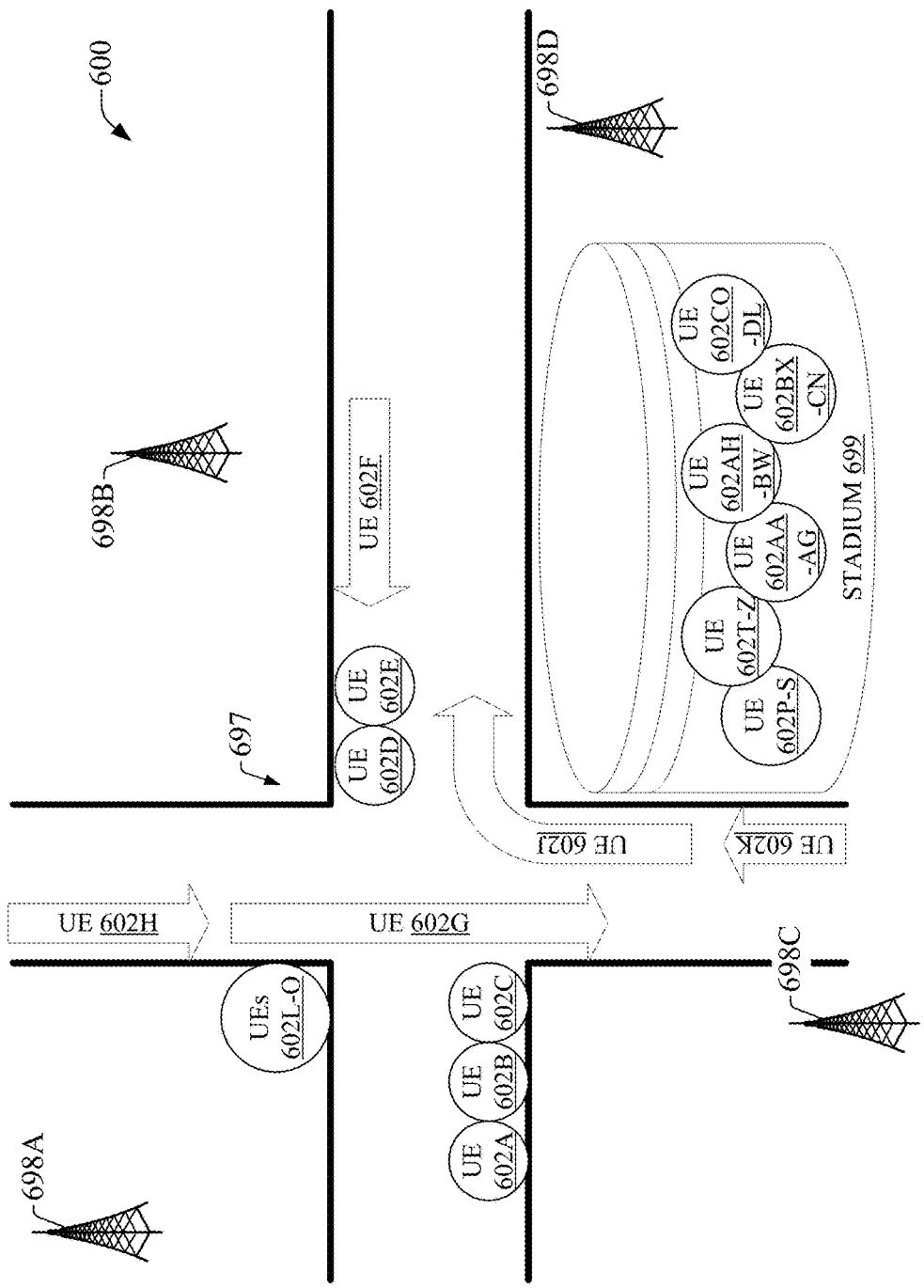
FIG. 6 illustrates examples of information employed in a system facilitating traffic analysis based on TFL information in accordance with aspects of the subject disclosure.

FIG. 6 is a graphic 600 illustrating examples of information employed in a system facilitating traffic analysis based on TFL information in accordance with aspects of the subject disclosure. Graphic 600 can include a plurality of UEs 602A-DL that can include TFL information components. TFL information components can facilitate access to TFL information. TFL information components can be communicatively coupled to location analysis components that can determine location characteristics from an analysis of TFL information. Location analysis components can be communicatively coupled to TFL-MSIG components that can generate information relating to a TFL motion segment for UEs based on location characteristics.

Graphic 600 illustrates TFL motion segments as circles when stationary and as elongated arrows when non-stationary. It is to be noted that this particular illustration convention is non-limiting and is only presented as an example to illustrate the motion, or lack thereof, in a form that can easily be grasped by a human reading the present disclosure. It is to be appreciated that TFL motion segment information need not be "illustrated" at all, or can be illustrated in any other useful form, without departing from the scope and spirit of the present disclosure. Graphic 600 includes intersection 697 that is representative of a signalized roadway intersection. Graphic 600 also includes stadium 699 representing a stadium facility located at intersection 697 as illustrated. Graphic 600 includes NodeB 698A, B, C, and D, of which six NBSPs can be formed, e.g., AB, AC, AD, BC, BD, and CD, to facilitate TFL measurements as previously disclosed.

Graphic 600 illustrates that UE 602A, 602B and 602C are associated with TFL motion segments that include location characteristics indicating that they are stopped at intersection 697 in a manner that can be determined to be queuing up at a signalized intersection while facing stop signal. Similarly, US 602D and 602E can be associated with location characteristics indicating that they are stopped at intersection 697 as well. Location characteristics of a TFL motion segment for UE 602F can describe that the UE is approaching the queue at intersection 697 and is slowing to a stop in the span of the relevant motion segment.

Cross traffic in graphic 600 can include UE 602G, which can be associated with location characteristics for a TFL motion segment indicating that UE 602G is accelerating through intersection 697. This can facilitate a determination in a traffic analysis system of which direction of traffic at intersection 697 is in motion and which is queuing traffic. UE 602H can be associated with location characteristics that describe it as accelerating though not traveling as far as 602G in a similar time frame. Across intersection 697 from UE 602G and H, UE 602J can be accelerating and making a right hand turn near stadium 699. Similarly, UE 602K can be accelerating but not traveling as far as 602J, as indicated by the magnitude of the elongated arrows. Graphic 600 allows rapid visualization of vehicular traffic patterns based on TFL information.

Similar visualization can be made for non-vehicular traffic as illustrated by UEs 602L-O being collocated at the corner of intersection 697. Whereas none of UEs 602L-O are indicated as in motion in the direction of vehicular traffic flow, it can be determined that there is a strong likelihood that the UEs are associated with pedestrian traffic seeking to cross intersection 697 in the direction of queuing vehicular traffic. This information can be compared against information about intersection 697, for example by accessing mapping information, e.g., by way of map interface components similar to 370 or 470. Where intersection 697 does not have pedestrian traffic input devices, the analysis that indicates that the pedestrians are waiting to cross intersection 697 can be employed as an input to begin cycling the traffic signals at intersection 697. In some embodiments, such as high bicycle use corridors, this type of analysis and control can be particularly useful in transitioning signalized intersections in a manner that accommodates non-vehicular traffic without significant capitol investments in user interface hardware at each intersection.

The large number of UEs, e.g., 602P-DL, located at stadium 699 in graphic 600 can correlate to a large number of people located at an event held at stadium 699. Analysis of the TFL information for these UEs can forecast a likely increase in traffic when the event concludes and the people at the stadium flood out. Based on the analysis of the TFL motion segment information for the UEs located at stadium 699, an estimate of traffic can be made and rules can be applied to determine a dynamic traffic response for the end of the event to reduce the impact of the forecast increased traffic flow. In an aspect, when the UEs at stadium 699 begin to move out of stadium 699, location characteristics of the individual TFL motion segments for the plurality of UEs 602P-DL can reflect the dispersal of the UEs. This dispersal, for example, can trigger traffic management systems to transition to the determined dynamic traffic response. Further, when the density of UEs at, or near, stadium 699 has passed a threshold level, for example, when the dispersal is nearly complete, the traffic management systems can transition back to a 'normal' mode of operation based on the expectation that the cause of the increased traffic has been removed or completed.

FIG. 6 is presented only to better illustrate some of the benefits of the presently disclosed subject matter and is explicitly not intended to limit the scope of the disclosure to the various aspects particular to the presently illustrated non-limiting example. In some embodiments, the use of GPS or other location technology can be included as complimentary to TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are represented in graphic 600, the timing information from those legacy devices can be employed in TFL information determinations and similarly in traffic analysis. This can be particularly useful in regions that have limited distribution of GPS enabled UEs or where GPS functions poorly due to environmental factors such as urban cores, mountainous regions, etc.

In view of the example system(s) described above, example method(s) that can be implemented in accordance with the disclosed subject matter can be better appreciated with reference to flowcharts in FIG. 7-FIG. 10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 7:
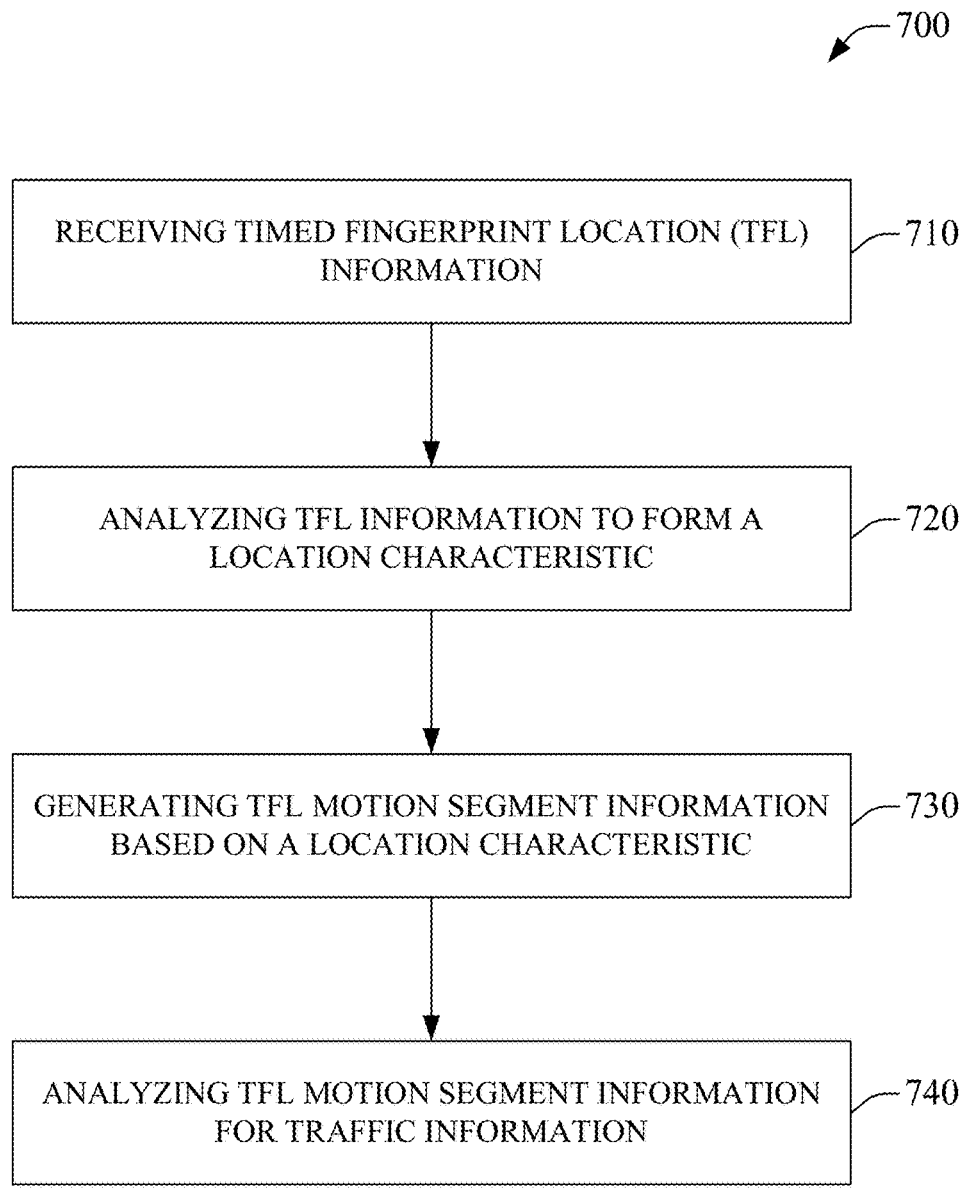
FIG. 7 illustrates a method facilitating traffic analysis based on TFL information in accordance with aspects of the subject disclosure.

FIG. 7 illustrates aspects of a method 700 facilitating traffic analysis based on TFL information in accordance with aspects of the subject disclosure. At 710, TFL information can be received. TFL information can be location information derived from TFL timing information or TFL timing information that can facilitate determining a location. TFL information can include information to determine a differential value for a NodeB site pair and a bin grid frame, as disclosed in more detail in incorporated U.S. Ser. No. 12/712,424.

TFL information can include location information or timing information as disclosed in more detail in U.S. Ser. No. 12/712,424 filed Feb. 25, 2010, which application is hereby incorporated by reference in its entirety. Further, such information can be received from active state or idle state user equipment as disclosed in more detail in U.S. Ser. No. 12/836,471, filed Jul. 14, 2010, which application is also hereby incorporated by reference in its entirety. As such, TFL information can include location information for a UE, in an active or idle state, based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?,X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE. Employing TFL information for location determination is demonstrably different from conventional location determination techniques or systems such as GPS, eGPS, triangulation or multilateration in wireless carrier environments, near field techniques, or proximity sensors.

At 720, method 700 can analyze the TFL information to determine location characteristics. The location characteristics can be nearly any characteristic related to the location determined by analysis of the TFL information. A location characteristic can describe an aspect of the UE location and a set of location characteristics can therefore describe some or all aspects of the UE location.

At 730 of method 700, TFL motion segment information can be generated based on location characteristics. A TFL motion segment can be a set of location characteristics. The TFL motion segment can include location characteristics as a function of nearly any metric without departing from the scope of the present disclosure. Further, the TFL motion segment can contain location characteristics that are not functions of any value, for example, a TFL motion segment comprising a single bin grid identification value.

At 740, traffic information can be determined from an analysis of the TFL motion segment information. At this point, method 700 can end. For example, where a TFL motion segment includes location characteristics describing a vehicle that is alternately accelerating and then decelerating on an interstate highway, it can be determined that these location characteristics indicate 'stop-and-go' traffic. The particular analytical tools applied to the TFL motion segment information is outside of the scope of the present subject matter, however, nearly any transportation analytic tool can readily be applied to a location characteristic derived from TFL information and embodied in the TFL motion segment information as disclosed herein.

Figure 8:
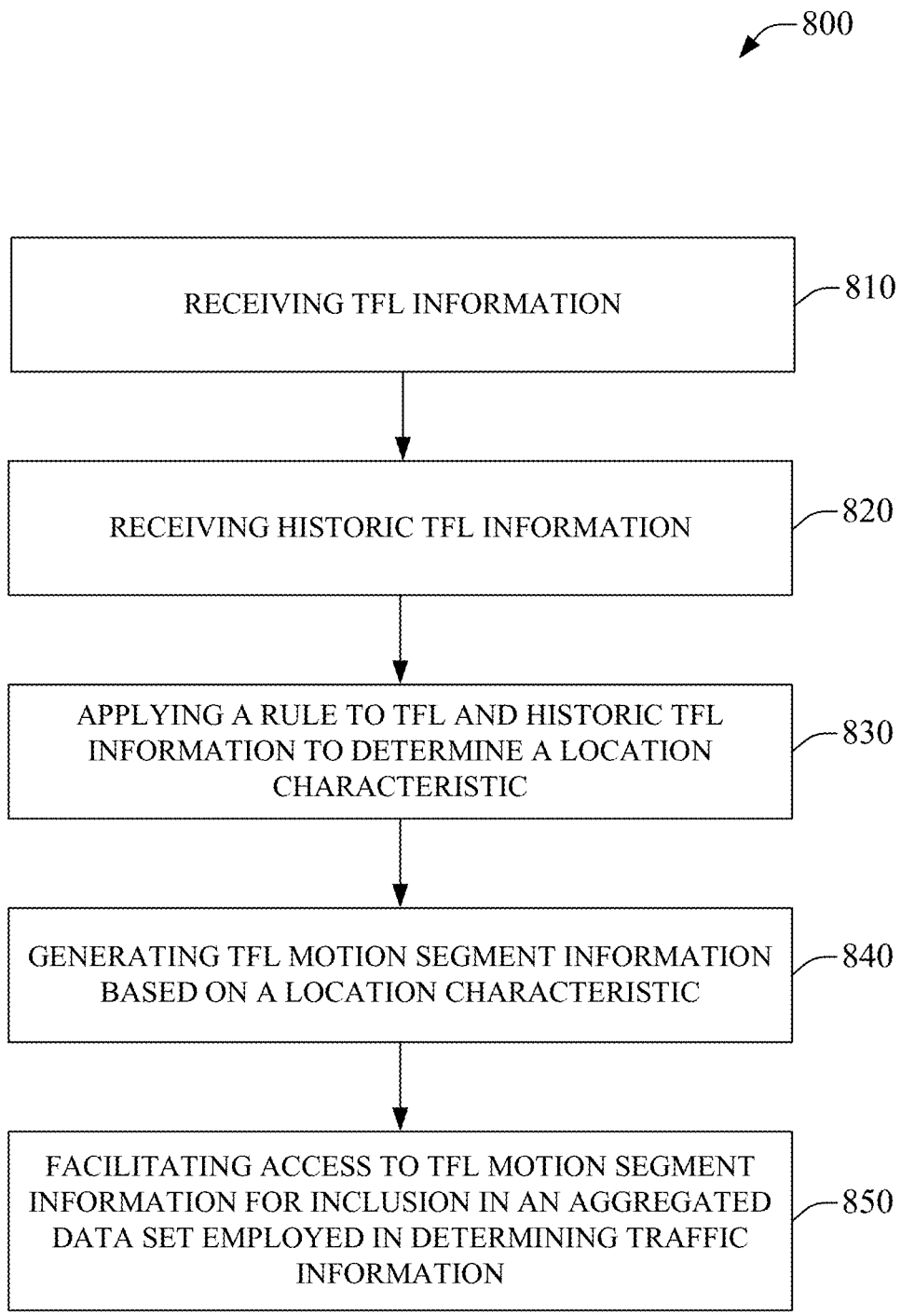
FIG. 8 illustrates a method for facilitating traffic analysis based on TFL information in accordance with aspects of the subject disclosure.

FIG. 8 illustrates a method 800 that facilitates traffic analysis based on TFL information in accordance with aspects of the subject disclosure. At 810, TFL information can be received. At 820, historic TFL information can be received. At 830, a rule can be applied to the TFL and historic TFL information to determine a location characteristic. In an aspect, this location characteristic can be a historic location characteristic. At 840, TFL motion segment information can be generated based on the location characteristic from 830. In an aspect, the TFL motion segment information can be historic TFL motion segment information. The historic TFL motion segment information can be sequential or non-sequential motion segment information.

At 850, TFL motion segment information can be accessed for inclusion in an aggregated data set. At this point, method 800 can end. The aggregated data set can be employed in determining traffic information. Facilitating access to TFL motion segment information and historic TFL motion segment information can allow the TFL motion segment information to be included in larger data sets used by traffic information services. These traffic information services can be any number of traffic information providers and can include traffic information services not affiliated with entities employing method 800. For example, a wireless carrier can employ method 800 and can facilitate access, at 850, to an internet search engine run by a separate business entity, to a government transportation analysis entity, to a $3^{rd}$ party traffic information vendor, to a media corporation for inclusion in their traffic news reporting, etc. In another embodiment, the aggregated data set can be associated with an entity employing method 800, such as where a map service employs method 800 and operates the aggregated data set.

Figure 9:
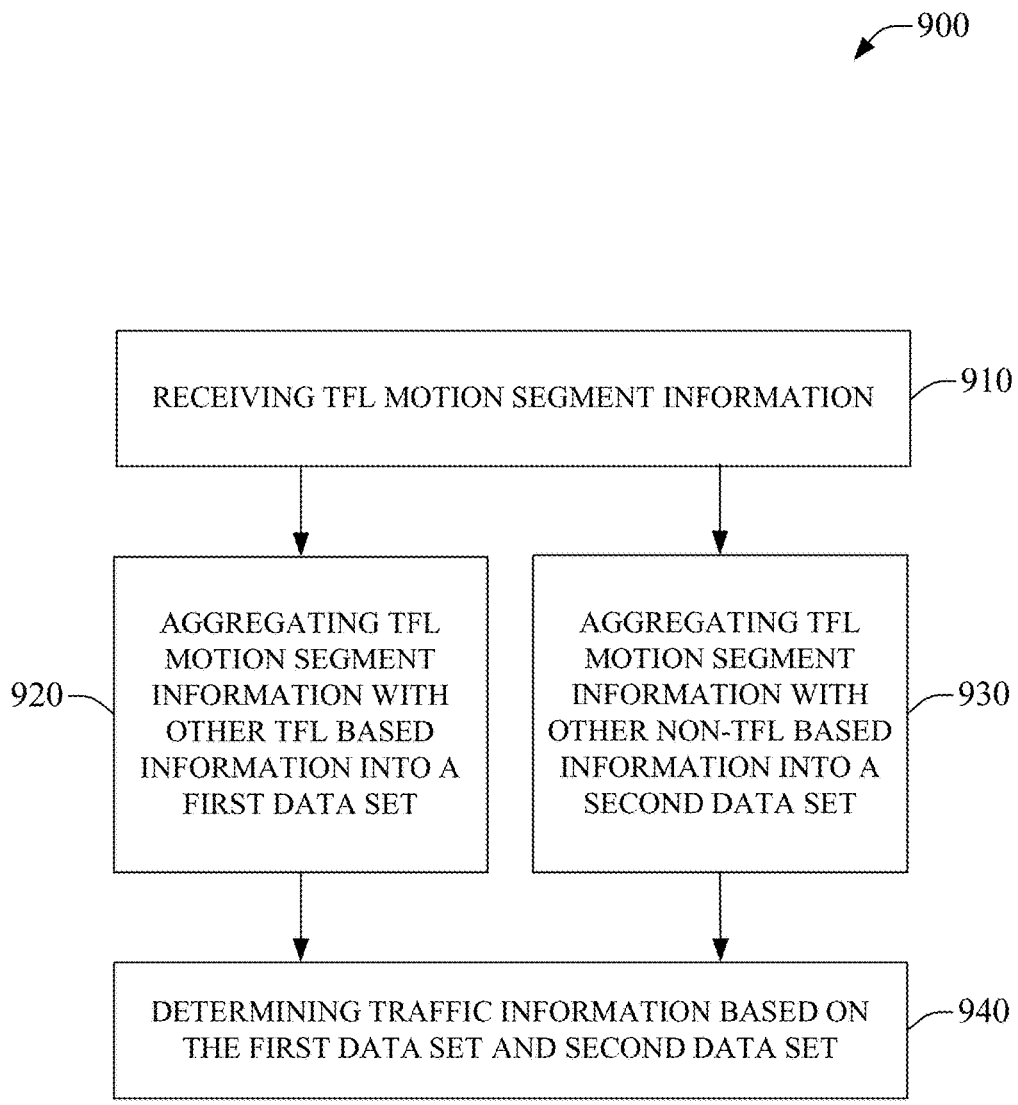
FIG. 9 illustrates a method facilitating traffic analysis based on TFL information in accordance with aspects of the subject disclosure.

FIG. 9 illustrates a method 900 facilitating traffic analysis based on TFL information in accordance with aspects of the subject disclosure. At 910, TFL motion segment information can be received. This TFL motion segment information can be derived from TFL information. At 920, TFL motion segment information can be aggregated with other TFL based information from other UEs into a first data set. At 930, TFL motion segment information can be aggregated with other non-TFL based information into a second data set. In an embodiment, the first and second data sets can be subsets of a third data set.

At 940, traffic information based on the first and second data set can be determined. At this point, method 900 can end. In an embodiment, the first or second data sets can be empty sets, e.g., data sets that contain no information. Moreover, in some embodiments, the first and second data sets can contain the same information. This can occur, for example, when the TFL information is aggregated with an empty first data set and an empty second data set resulting in the first and second data sets containing only the TFL information. Further, where the first and second data sets are subsets of a third data set, the TFL information can simply be aggregated with the third data set such that the first and second data sets effectively represent subsets that have each been aggregated with the TFL information.

In an aspect, method 900 provides a method of employing pure TFL information for traffic analysis or TFL information mixed with non-TFL information for traffic analysis. In an embodiment, TFL information can be combined with almost any type of transportation analytics data from other sensors and systems in a symbiotic manner to provide traffic information based, at least in part, on TFL information. For example, TFL motion segment information can be aggregated with near field communication information such that the location characteristics of the TFL motion segment can describe a deceleration and the near field communication information can provide a location. As a second example, TFL motion segment information can include location characteristics that describe location as a function of time and this information can be combined with a GPS data set such that possible errors in either the GPS location measurements or the TFL location characteristics can be corrected for. Continuing the second example, where a TFL bin grid granularity is coarse, the GPS location may be more precise, or in the alternative, where the UE is located in a long tunnel, the GPS may be highly inaccurate due to significant interference from the concrete of the tunnel and reliance on the TFL information would be more precise. As a third example, TFL information can be readily aggregated with transportation analytics data sets containing information from loop sensors, proximity sensors, GPS information, traffic cameras, etc., to provide for an enriched transportation analytics data set.

Figure 10:
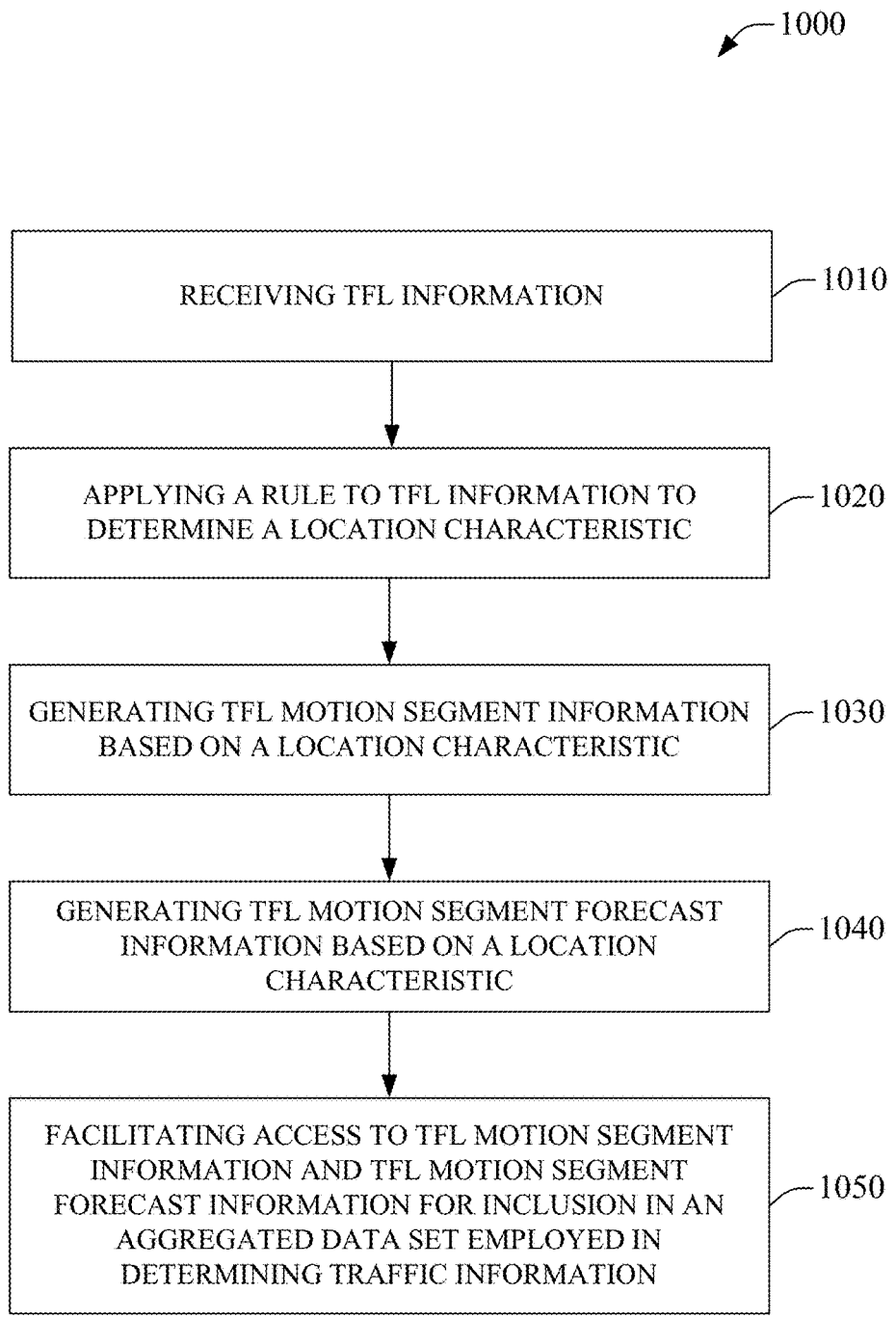
FIG. 10 illustrates a method for facilitating predictive traffic analysis based on TFL information in accordance with aspects of the subject disclosure.

FIG. 10 illustrates a method 1000 that facilitates predictive traffic analysis based on TFL information in accordance with aspects of the subject disclosure. At 1010, TFL motion segment information can be received. At 1020, a rule can be applied to the TFL information to determine a location characteristic. At 1030, TFL motion segment information can be generated based on the location characteristic.

At 1040, TFL motion segment forecast information can be generated based on the location characteristic. The TFL motion segment forecast information can be predictive information. In an embodiment, a location characteristic from 1020 can be correlated with historic TFL motion segment information patterns. For example, a location characteristic that describes a non-moving vehicle on two-lane highway at rush hour can be historically correlated with a disabled vehicle or an accident. This correlation can be related to increased traffic volumes behind the non-moving vehicle and decreased traffic volumes in front of the non-moving vehicle. This exemplary historic information can be leveraged to forecast traffic backups based on an instant location characteristic indicating non-moving vehicle on a two-lane highway at rush hour. As a second example, sporting events can be associated with traffic patterns such that congregation of UEs at a stadium on a game night can be employed to forecast particular traffic patterns when the game lets out.

At 1050, TFL motion segment information and TFL motion segment forecast information can be accessed for inclusion in an aggregated data set. At this point, method 1000 can end. The aggregated data set can be employed in determining traffic information. Facilitating access to TFL motion segment information and TFL motion segment forecast information can allow predictive traffic information to be included in larger data sets used by traffic information services. In an embodiment, the forecast information can be designated as predictive or can be associated with other values, such as, confidence factors, etc. Traffic information services can be any number of traffic information providers.

Figure 11:
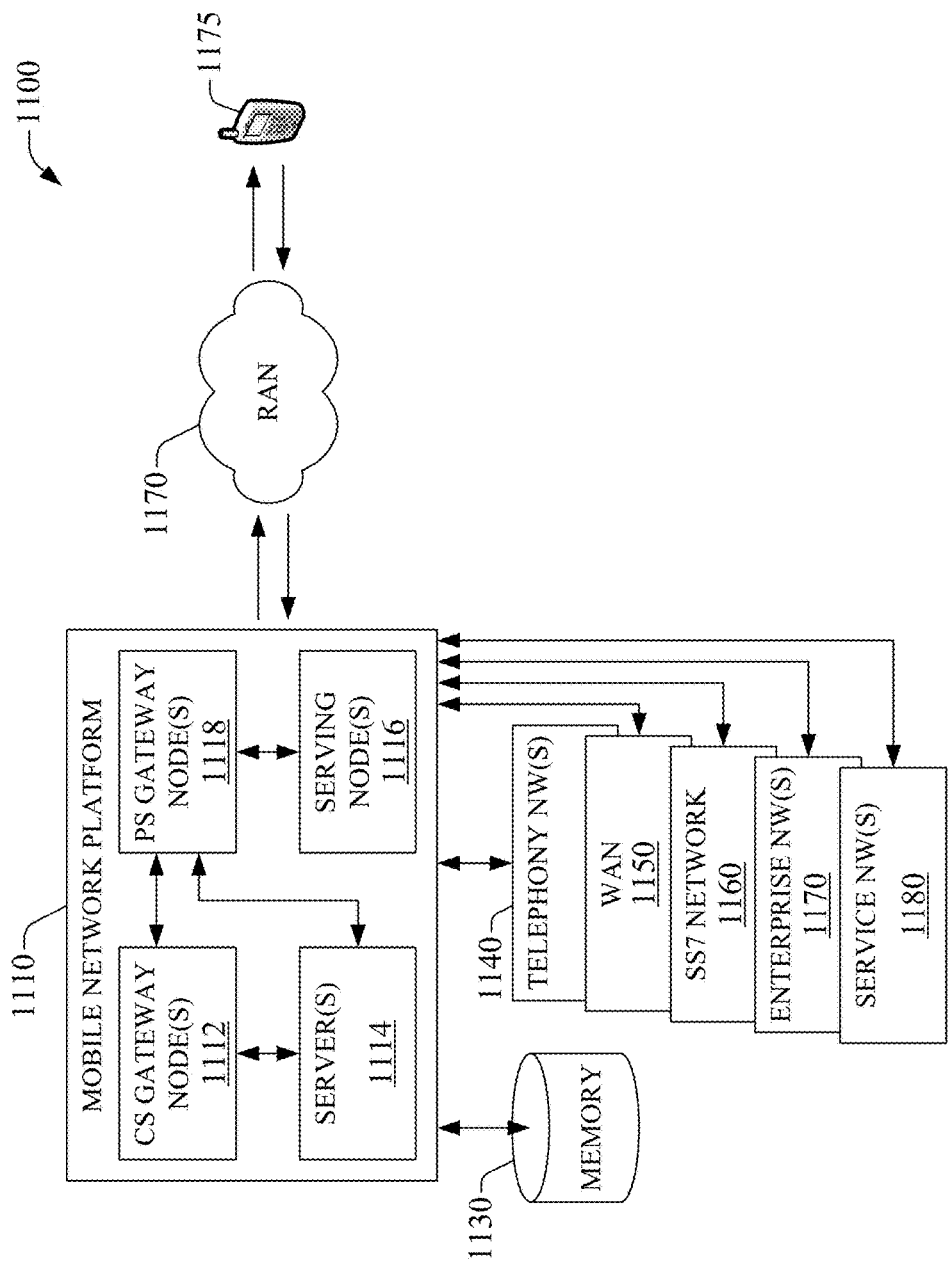
FIG. 11 is a block diagram of an exemplary embodiment of a mobile network platform to implement and exploit various features or aspects of the subject disclosure.

FIG. 11 presents an example embodiment 1100 of a mobile network platform 1110 that can implement and exploit one or more aspects of the subject innovation described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included as part of a telecommunications carrier network. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Further, TFL information can be stored in memory 1130. The TFL information can be received from TFL enabled mobile device 1175. In an aspect, the TFL information can be based on timing signals associated with communication between mobile network platform 1110 and mobile device 1175 by way of RAN 1170. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

Figure 12:
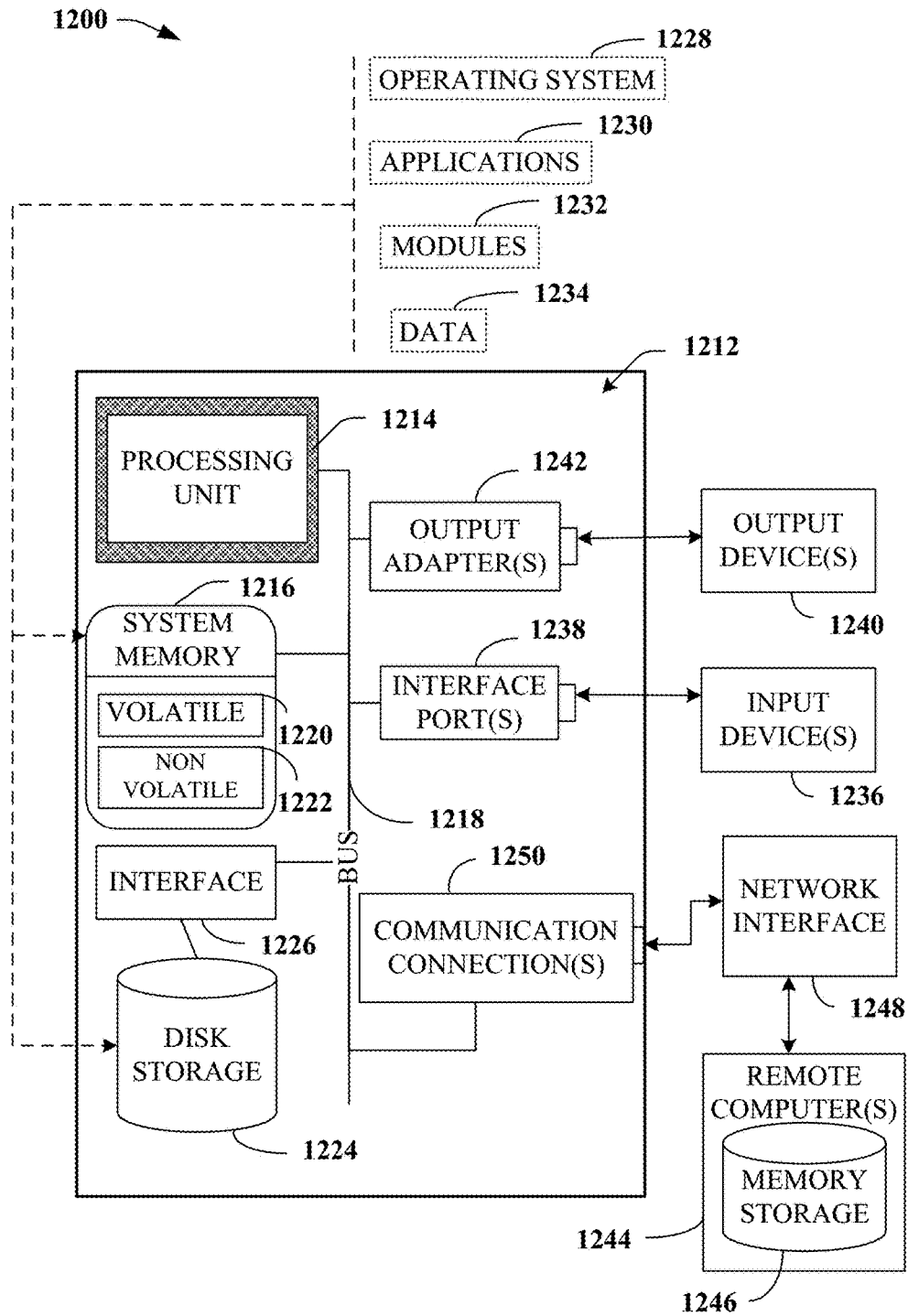
FIG. 12 illustrates a block diagram of a computing system operable to execute the disclosed systems and methods in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1220, non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212 includes a processing unit 1214, a system memory 1216, and a system bus 1218. In an embodiment, computer 1212 can be part of the hardware of a timed fingerprint location component, part of the hardware of a location analysis component (e.g., LAC 120), etc. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226. In an embodiment, disk storage 1224 can store a TFL lookup tables to facilitate lookup of location information based on NodeB site pairs and time values, historical fraud information, UE identifiers information, LAT transaction identifiers, etc. In another embodiment, disk storage 1224 can store TFL location information, a location characteristic, TFL motion segment information, or combinations thereof.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus

1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically provide some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving a differential time measurement for a user equipment and a first NodeB site pair of devices, wherein the first NodeB site pair of devices comprises a first NodeB device and a second NodeB device;
        receiving first timed fingerprint location information comprising a historical differential timing measurement, correlated to a first historical geographic location value, for the first NodeB site pair of devices;
        estimating a geographic location of the user equipment, resulting in an estimated geographic location, based on the differential time measurement, an intersection of possible locations determined from the first timed fingerprint location information for the first NodeB site pair of devices and second timed fingerprint location information for a second NodeB site pair of devices, historic geographic location values corresponding to the first NodeB site pair of devices, and a second historic geographic location value corresponding to the second NodeB site pair of devices;
        generating a location characteristic associated with the user equipment based on the estimated geographic location of the user equipment to facilitate determining motion of the user equipment based on location analytics; and
        determining motion segment information, based on location characteristics comprising the location characteristic, as a first function of a selectable variable, wherein the motion segment information indicates changes in the location characteristics for the user equipment, and wherein the location characteristic is determined as a second function of a type of transportation determined to be associated with the user equipment.

2. The system of claim 1, wherein the determining the motion segment information is determined as a third function of a time variable.

3. The system of claim 2, wherein the determining the motion segment information comprises determining a position characteristic from the location characteristics at a first time interval.

4. The system of claim 2, wherein the determining the motion segment information comprises determining a position characteristic from the location characteristics at a first time interval where a speed of the user equipment is determined to be less than a first speed.

5. The system of claim 4, wherein the determining the motion segment information comprises determining the position characteristic from the location characteristics at a second time interval where the speed of the user equipment is determined to be at least a second speed.

6. The system of claim 1, wherein the type of transportation is automotive transportation.

7. The system of claim 1, wherein the type of transportation is bipedal locomotion.

8. The system of claim 1, wherein the type of transportation is bicycle locomotion.

9. The system of claim 1, wherein the determining the motion segment information is based on the location characteristics determined as a fourth function of a proximity variable.

10. The system of claim 9, wherein the determining the motion segment information comprises determining a user equipment population density characteristic based on a proximity of the user equipment to a selected location.

11. The system of claim 10, further comprising adapting a transportation management system based on the estimated geographic location and the user equipment population density characteristic.

12. The system of claim 11, wherein the adapting the transportation management system comprises adjusting a cost of use based on the estimated geographic location and the user equipment population density characteristic.

13. A method, comprising:
    receiving, by a system comprising a processor, a differential time measurement for a user equipment coupled to a first NodeB site pair of devices comprising a first NodeB device and a second NodeB device;

receiving, by the system, first timed fingerprint location information comprising a historical differential timing measurement, correlated to a first historical geographic location value, for the first NodeB site pair of devices;

determining, by the system, a geographic location of the user equipment based on the differential time measurement, an intersection of possible locations determined from the first timed fingerprint location information for the first NodeB site pair of devices and second timed fingerprint location information for a second NodeB site pair of devices, the first historic geographic location value for the first NodeB site pair of devices, and a second historic geographic location value for the second NodeB site pair of devices;

receiving, by the system, location characteristics comprising a location characteristic associated with the user equipment based on the geographic location of the user equipment, wherein the location characteristic was determined as a first function of a type of transportation determined to be associated with the user equipment; and enabling, by the system, adaptation of a transportation management system in response to determining motion segment information, based on the location characteristics, as a second function of a selectable variable.

14. The method of claim 13, wherein the determining the motion segment information is based on the location characteristic determined as a third function of a temporal variable.

15. The method of claim 14, wherein the determining the motion segment information comprises determining a position characteristic from the location characteristic at a first time interval when the user equipment is determined to be moving at a speed that is less than a first speed and determining the position characteristic from the location characteristic at a second time interval when the user equipment is determined to be moving at another speed that is at least the first speed.

16. The method of claim 13, wherein the type of transportation is vehicular transportation.

17. The method of claim 13, wherein the type of transportation is railway transportation.

18. The method of claim 13, wherein the enabling the adaptation of the transportation management system comprises adapting control of a signalized intersection based on the motion segment information.

19. A non-transitory machine-readable storage medium, comprising executable instructions that, when executed by a processor, facilitate performance of operations, comprising:

receiving a differential time measurement for a user equipment coupled to a first NodeB site pair of devices comprising a first NodeB device and a second NodeB device;

receiving first timed fingerprint location information comprising a historical differential timing measurement, correlated to historical geographic location values, for the first NodeB site pair of devices;

determining a geographic location of the user equipment based on the differential time measurement, an intersection of possible locations determined from the first timed fingerprint location information for the first NodeB site pair of devices and second timed fingerprint location information for a second NodeB site pair of devices, the historical geographic location values for the first NodeB site pair of devices, and other historical geographic location values, other than the historical geographic location values, for the second NodeB site pair of devices;

receiving a location characteristic associated with the user equipment based on the geographic location of the user equipment;

determining motion segment information based on the location characteristic as a first function of a temporal variable, wherein the location characteristic was determined as a second function of a type of transportation determined to be associated with the user equipment; and adapting performance of a signalized intersection based on the motion segment information.

20. The non-transitory machine-readable storage medium of claim 19, wherein the determining the motion segment information is further based on the location characteristic as a function of a proximity variable related to a proximity of the user equipment to a determined location.

* * * * *